(12) United States Patent
Ryshavy et al.

(10) Patent No.: US 8,480,108 B2
(45) Date of Patent: *Jul. 9, 2013

(54) AUTOMOTIVE SUSPENSION ADJUSTMENT APPARATUS

(75) Inventors: John W. Ryshavy, Wayzata, MN (US); Shawn Christopher Miller, Milaca, MN (US); James R. Ryshavy, Eden Prairie, MN (US)

(73) Assignee: Stempf Automotive Industries, Inc., MInnetonka, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/553,408

(22) Filed: Jul. 19, 2012

(65) Prior Publication Data

US 2013/0049319 A1    Feb. 28, 2013

Related U.S. Application Data

(63) Continuation-in-part of application No. 13/222,771, filed on Aug. 31, 2011, now Pat. No. 8,317,211.

(51) Int. Cl.
*B60G 11/00*    (2006.01)

(52) U.S. Cl.
USPC .................................................. 280/124.175

(58) Field of Classification Search
USPC ........................ 280/124.175, 124.174, 124.17
See application file for complete search history.

(56) References Cited

U.S. PATENT DOCUMENTS

| | | | |
|---|---|---|---|
| 5,467,971 | A | 11/1995 | Hurtubise et al. |
| 5,470,049 | A | 11/1995 | Wohler et al. |
| 5,788,262 | A | 8/1998 | Dazy et al. |
| 6,257,601 | B1 | 7/2001 | Spears et al. |
| 6,273,407 | B1 | 8/2001 | Germano |
| 6,485,223 | B1 | 11/2002 | Van Schmus et al. |
| 6,820,883 | B2 | 11/2004 | Lang et al. |
| 7,066,309 | B2 | 6/2006 | Colas et al. |
| 7,311,181 | B2 | 12/2007 | Germano et al. |
| 7,537,225 | B2 | 5/2009 | Ryshavy et al. |
| 7,607,668 | B2 | 10/2009 | Dugandic et al. |
| 7,780,178 | B2 | 8/2010 | Ryshavy et al. |
| 7,850,183 | B1 | 12/2010 | Ryshavy et al. |
| 7,976,039 | B2 | 7/2011 | Hirve et al. |
| 8,109,492 | B2 | 2/2012 | Winocur |
| 2004/0155424 | A1 | 8/2004 | Hicks et al. |
| 2005/0017475 | A1 | 1/2005 | Hellums |
| 2007/0187919 | A1 | 8/2007 | Furman |
| 2012/0098215 | A1 | 4/2012 | Rositch et al. |

*Primary Examiner* — Faye M. Fleming
(74) *Attorney, Agent, or Firm* — Haugen Law Firm PLLP

(57) ABSTRACT

A vehicle suspension lift kit includes a first suspension lift component having a first interlocking pattern, and a second suspension lift component having a second interlocking pattern. The first and second interlocking patterns are selectively engagable with one another to prevent relative motion among the first and second components along an interfacial plane. Each of the first and second suspension lift components are specifically configured to be employed individually or in combination between a vehicular suspension and a vehicular axle to provide a selected extent of suspension lift.

10 Claims, 23 Drawing Sheets

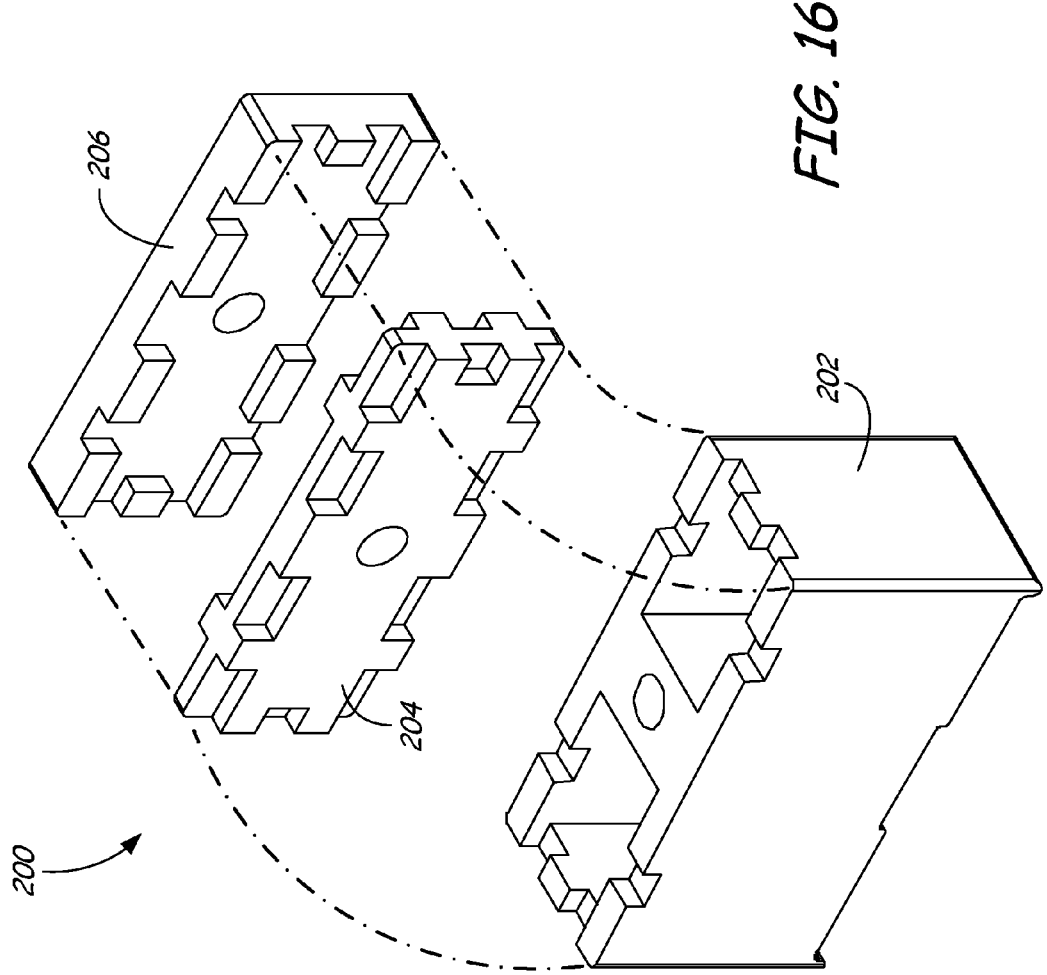

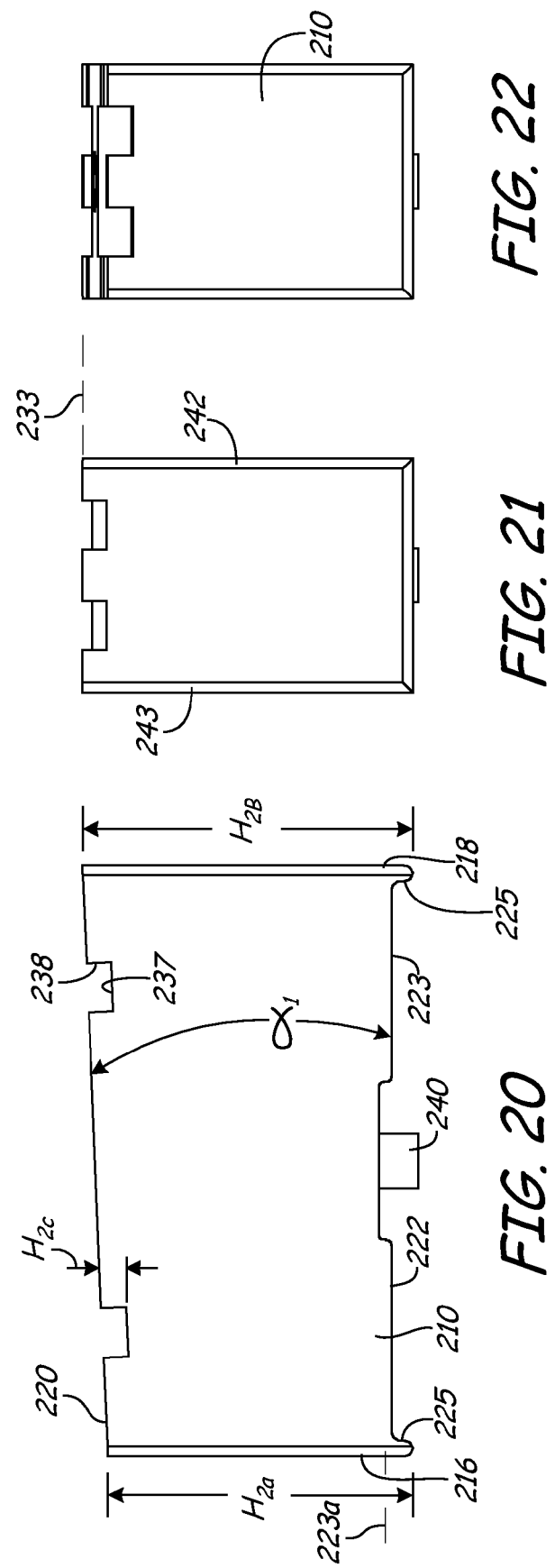

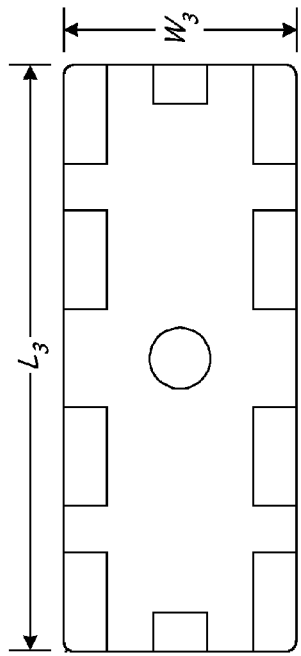
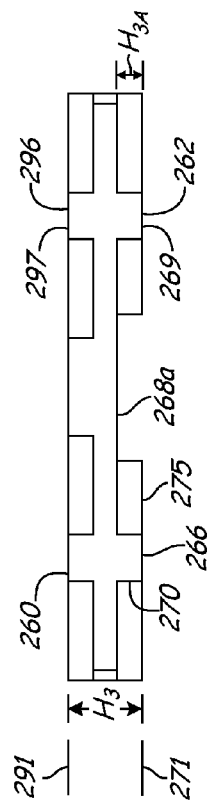
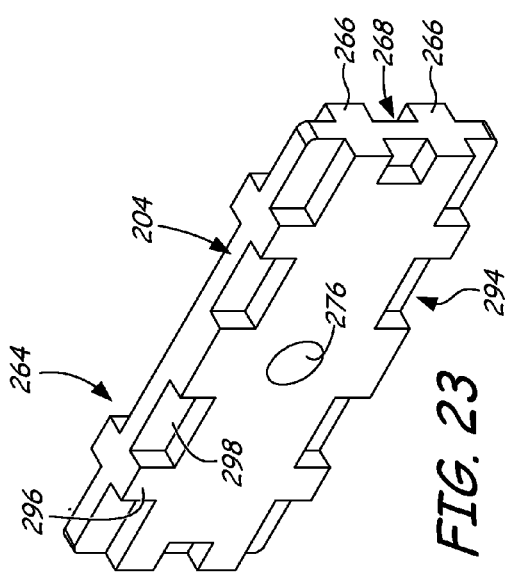
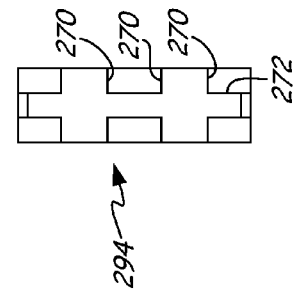

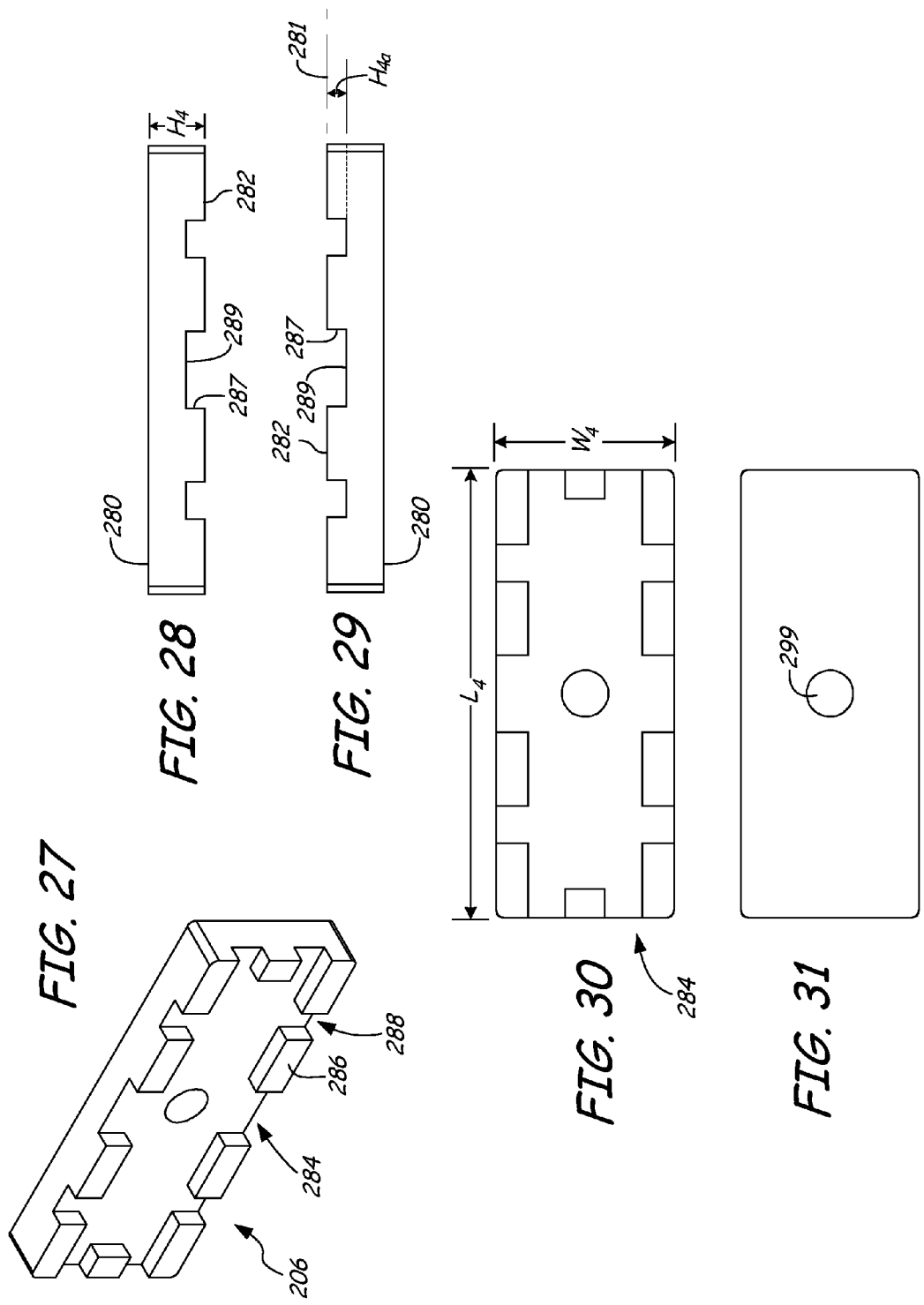

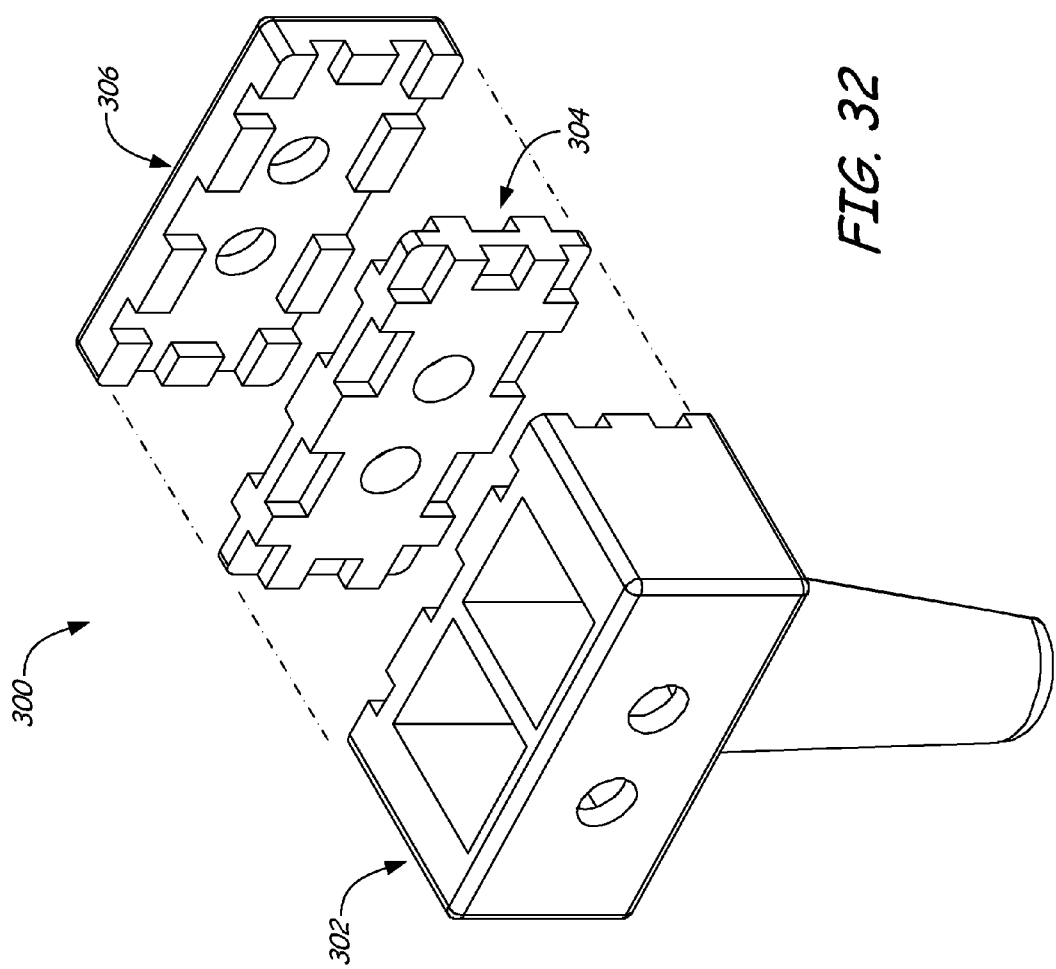

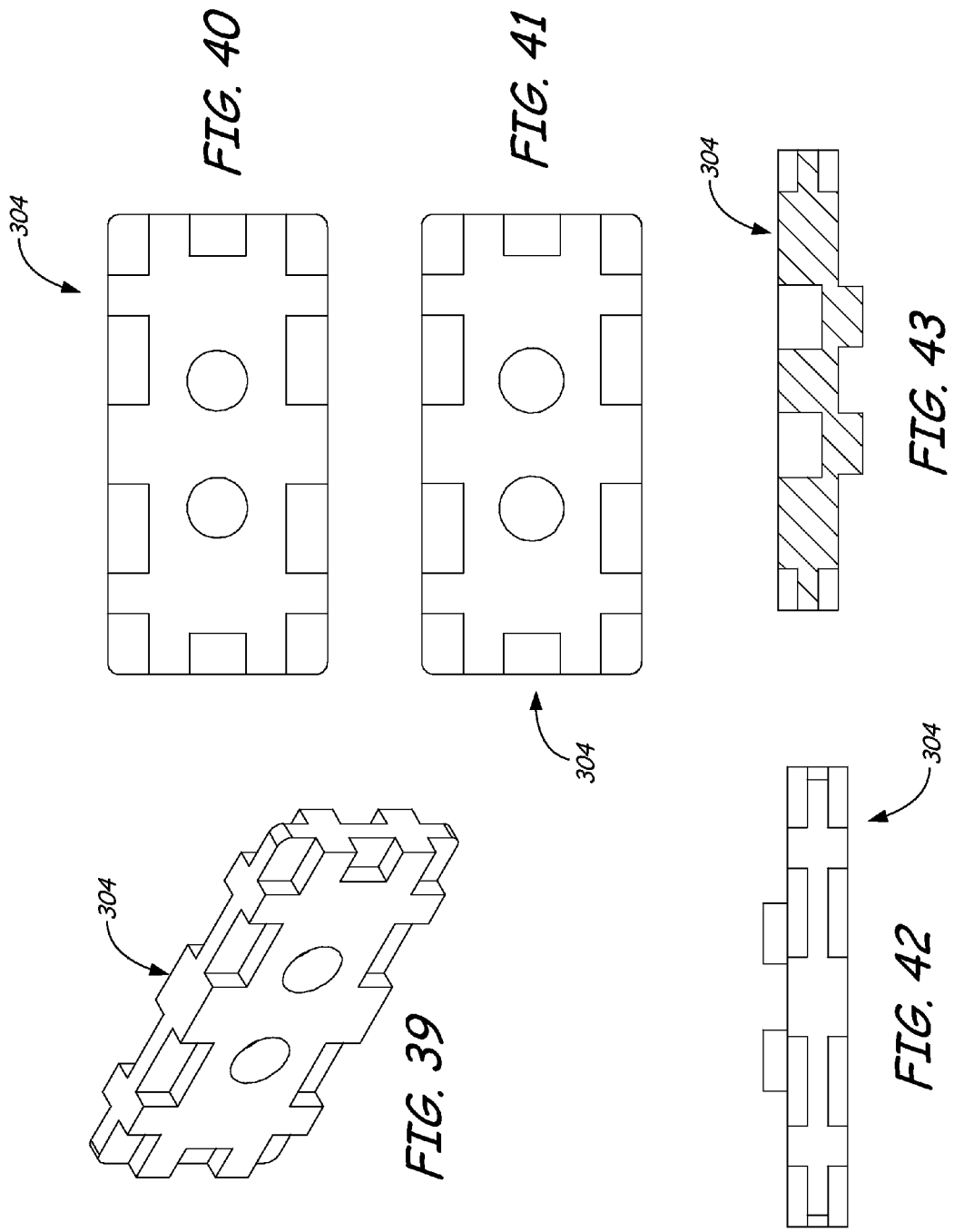

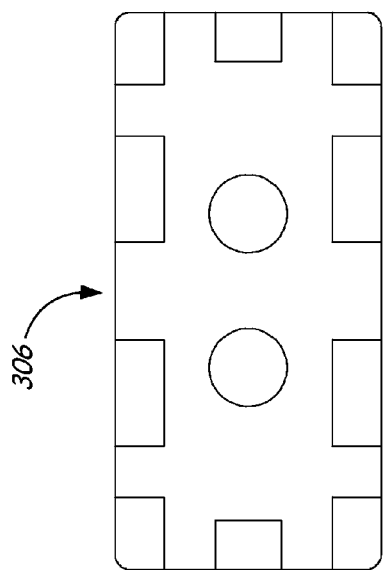
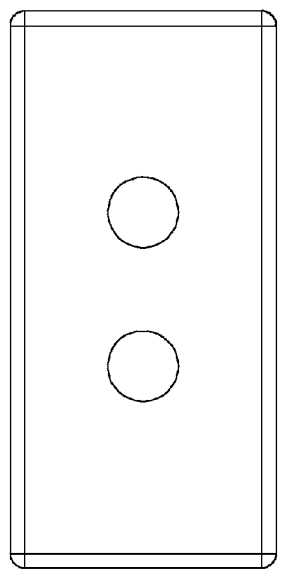
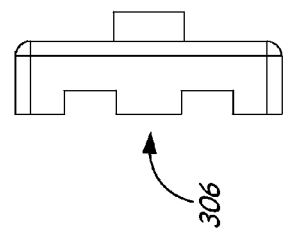
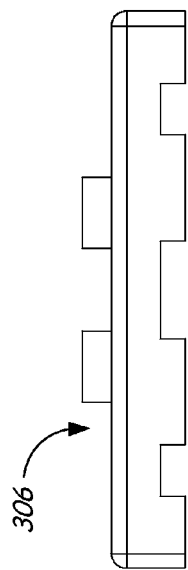
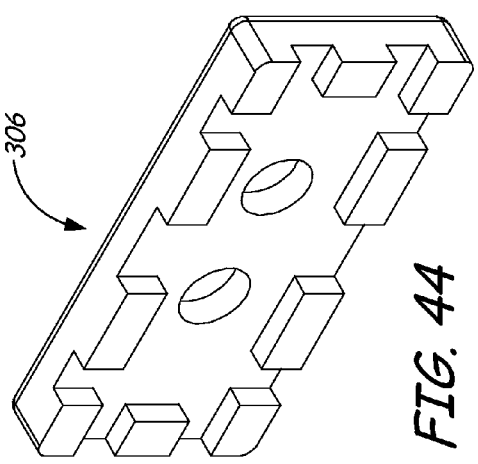

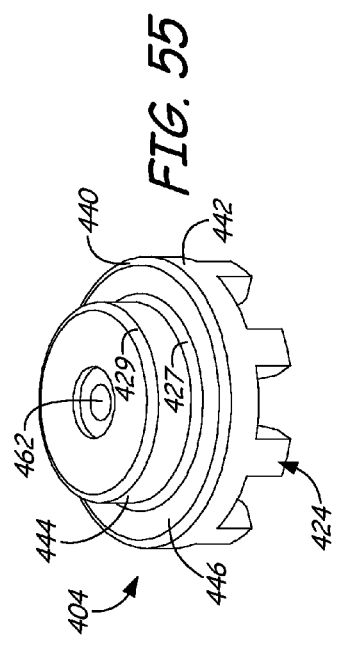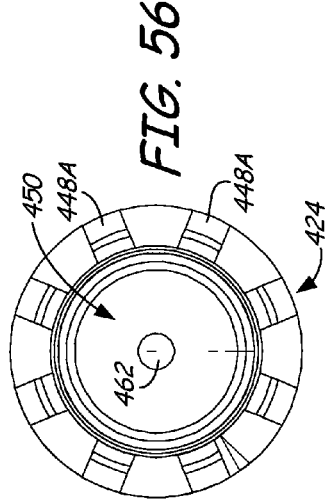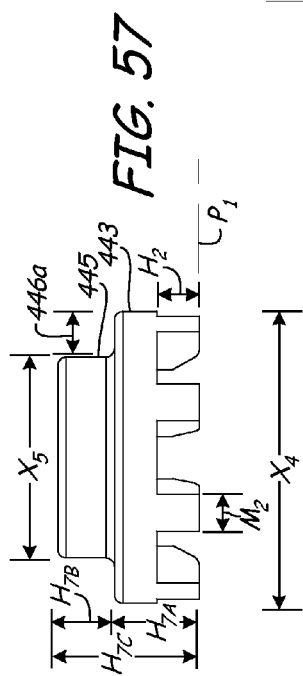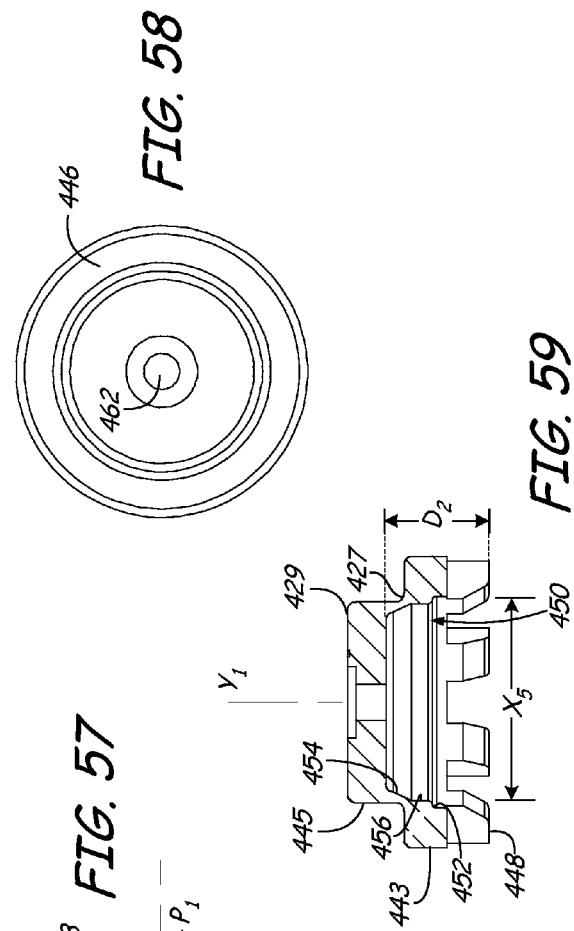

AUTOMOTIVE SUSPENSION ADJUSTMENT APPARATUS

CROSS-REFERENCE TO RELATED APPLICATIONS

This application is a continuation-in-part of U.S. Non-Provisional patent application Ser. No. 13/222,771, filed on Aug. 31, 2011 now U.S. Pat. No. 8,317,211 and entitled "Automotive Suspension Adjustment Apparatus," the content of which being incorporated herein in its entirety.

FIELD OF THE INVENTION

The present invention relates to automotive suspension systems generally, and more particularly to apparatus and methods for adjusting automotive suspension height, specifically at an interface between a leaf or coil spring suspension and a corresponding axle housing.

BACKGROUND OF THE INVENTION

Automotive suspension systems in use today incorporate a variety of arrangements to best suit the intended applications. A well known automotive suspension apparatus currently used primarily in truck suspensions is a system utilizing leaf springs. The system is designed to allow semi-independent movement of the axle housing assembly and the vehicle frame. Another common vehicular suspension involves coil springs.

In some instances, vehicle owners wish to modify the height of the vehicle frame with respect to the vehicle wheels. For example, owners may wish to increase the height of a vehicle frame for increased wheel clearance or aesthetic purposes.

Devices for effectuating such suspension height modification include static spacers of fixed dimension that are typically placed between the top of the axle housing and the leaf or coil spring suspension. The extent of the suspension height increase is predetermined by the dimension of the static spacer utilized. In many instances, the effect on vehicle ride quality due to suspension height extension is unpredictable. As a result, suspension height modifications are many times repeated in order to achieve a desired balance between suspension height and vehicle ride quality. As a result, a need exists in the art for a suspension height adjustment apparatus that enables a range of suspension height modifications.

It is therefore an objective of the present invention to provide a suspension adjustment apparatus that facilitates a range of suspension height modifications in a simple and inexpensive device.

BRIEF DESCRIPTION OF DRAWINGS

FIG. 16 is an exploded perspective view of a suspension lift kit of the present invention;

FIG. 20 is a side elevational view of the component illustrated in FIGS. 17-19;

FIG. 21 is a front elevational view of the component illustrated in FIGS. 17-20;

FIG. 22 is a rear elevational view of the component illustrated in FIGS. 17-21;

FIG. 23 is a top perspective view of a second component of the suspension lift kit illustrated in FIG. 16;

FIG. 24 is a top plan view of the component illustrated in FIG. 23;

FIG. 25 is a side elevational view of the component illustrated in FIGS. 23 and 24;

FIG. 26 is an end elevational view of the component illustrated in FIGS. 23-25;

FIG. 27 is a bottom perspective view of a third component of the suspension lift kit illustrated in FIG. 16;

FIG. 28 is a side elevational view of the component illustrated in FIG. 27;

FIG. 29 is a side elevational view of the component illustrated in FIGS. 27 and 28;

FIG. 30 is a bottom plan view of the component illustrated in FIGS. 27-29;

FIG. 31 is a top plan view of the component illustrated in FIGS. 27-30;

FIG. 32 is an exploded perspective view of a suspension lift kit of the present invention;

FIG. 39 is a top perspective view of a second component of the suspension lift kit illustrated in FIG. 32;

FIG. 40 is a top plan view of the component illustrated in FIG. 39;

FIG. 41 is a bottom plan view of a component illustrated in FIGS. 39 and 40;

FIG. 42 is a side elevational view of the component illustrated in FIGS. 30-41;

FIG. 43 is a side cross-sectional view of the component illustrated in FIGS. 29-42;

FIG. 44 is a bottom perspective view of a third component of the suspension lift kit illustrated in FIG. 32;

FIG. 45 is a bottom plan view of the component illustrated in FIG. 44;

FIG. 46 is a top plan view of the component illustrated in FIGS. 44 and 45;

FIG. 47 is a side elevational view of the component illustrated in FIGS. 44-46;

FIG. 48 is an end elevational view of the component illustrated in FIGS. 44-47;

FIG. 55 is a top perspective view of a second component of the suspension lift kit illustrated in FIG. 49;

FIG. 56 is a bottom plan view of the component illustrated in FIG. 55;

FIG. 57 is a side elevational view of the component illustrated in FIGS. 55-56;

FIG. 58 is a top plan view of the component illustrated in FIGS. 55-57; and

FIG. 59 is a side elevational cross-sectional view of the component illustrated in FIG. 55-58.

Like reference symbols in the various drawings indicate like elements.

DETAILED DESCRIPTION OF THE PREFERRED EMBODIMENTS

Orientational terms such as "top", "bottom", "sides", "upper", "lower" and the like are used in the specification to describe the embodiments of the invention as illustrated in the figures. It should be appreciated that in actual use, an embodiment of the invention may be rotated as needed to accomplish the aims of the invention. As a result of such rotation, the orientated terms used herein may not literally apply to a particular arrangement. In other words, the various terms of "top", "bottom", "base" and the like are relative and are used herein to describe the figures for illustration purposes and are not intended to limit the embodiments shown to any particular orientation.

The present invention is directed to a multi-unit vehicle suspension lift system designed to provide a range of suspension height modification by selecting among one or more lift elements individually or in combination to effectuate a variety of suspension lift heights. For example, the lift kit of the present invention may possess two or more static lift components. A first lift component of the lift kit may possess a first lift height. A second lift component of the lift kit may possess a second lift height that is different that the first lift height. The first and second lift components may be utilized individually, or in combination in a mutually engaged relationship, to effectuate a suspension height modification. Therefore, a user may select among a plurality of available arrangements to achieve a desired extent of suspension lift.

Figure 1:
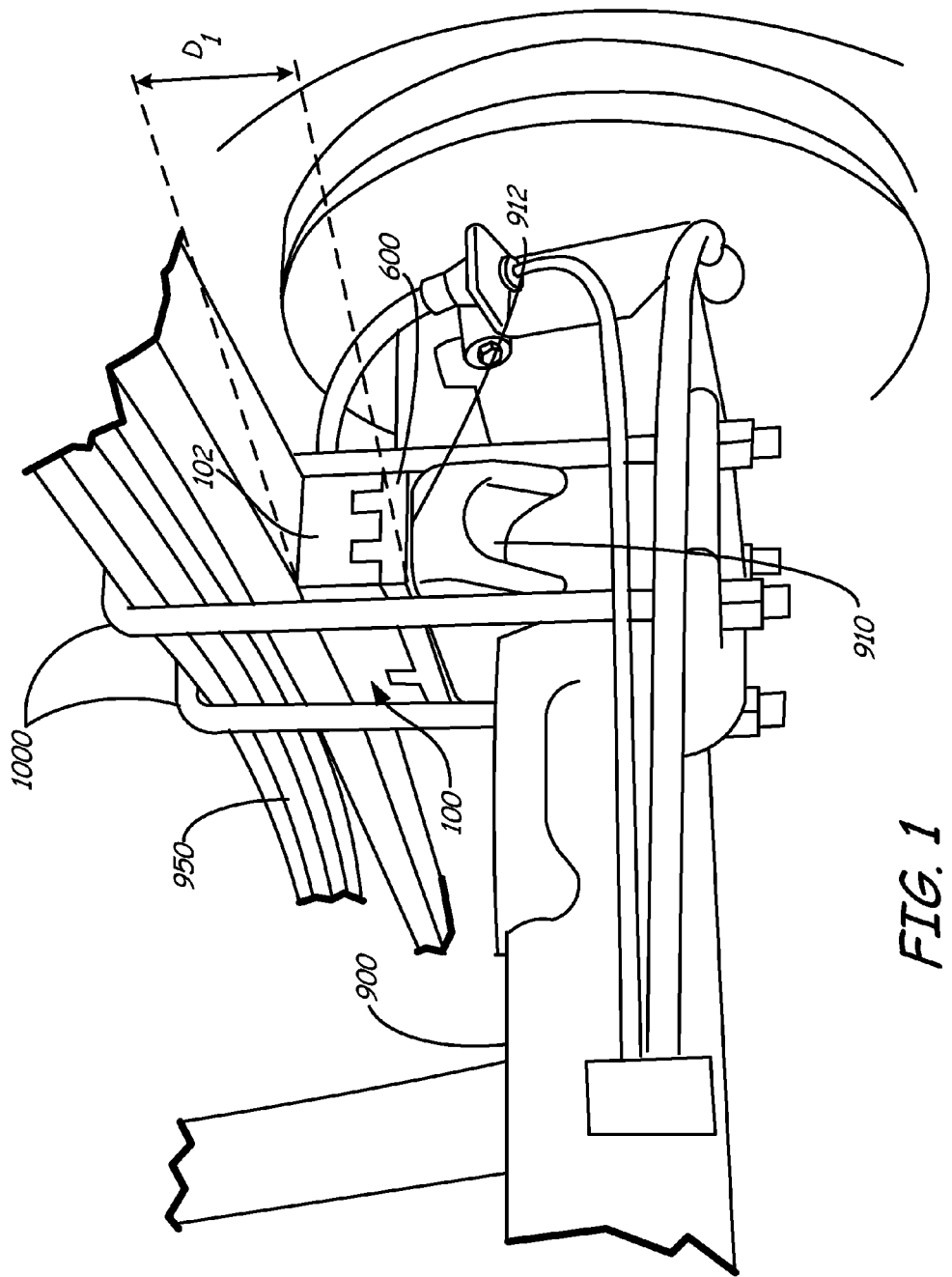
FIG. 1 is a schematic illustration of a suspension lift kit in position between a vehicle leaf spring suspension and a vehicle wheel axle housing.

A suspension adjustment apparatus is illustrated in FIG. 1, wherein suspension lift kit 100 is mounted between a leaf spring suspension 950 and a vehicular axle housing 900 to adjust a distance between axle housing 900 and leaf spring suspension 950. In particular, suspension lift kit 100 acts as a spacer with a plurality of configurations to allow the user to select a desired suspension lift dimension provided by one or more components of suspension lift kit 100. Lift dimension "$D_1$" is therefore defined by a height dimension "$H_1$" of the utilized components of suspension lift kit 100. In the embodiment illustrated in FIG. 1, first and second suspension lift components 102, 600 are utilized in combination as suspension lift kit 100 to define lift kit height "$H_1$", and correspondingly the lift dimension "$D_1$" of the spacing lift of leaf spring suspension 950 with respect to axle housing 900. In one embodiment, therefore, suspension lift kit 900 includes first and second suspension lift components 102, 600 that may be used individually or in combination to define a desired lift dimension "$D_1$" between leaf spring suspension 950 and axle housing 900.

Leaf spring suspensions, such as leaf spring suspension 950 illustrated in the drawings, are typically secured between a vehicular axle assembly and the vehicle frame to interface and dampen movement between the axle assembly and the frame. The movement dampening/isolation performed by the leaf spring suspension reduces undesired movement of the vehicle cab as the axle assembly, which may be directly secured to the vehicle wheels, are exposed to substantially direct response from roadway undulations. In typical arrangements, a leaf spring mounting bracket 910 is employed in combination with axle housing 900, wherein leaf spring mounting bracket 910 may be welded or otherwise secured to axle housing 900 to establish a mounting surface 912 to which leaf spring suspension 950 may be operably secured in a conventional arrangement. In at least one embodiment of the present invention, suspension lift kit 100 may be secured to mounting surface 912 of leaf spring mounting bracket 910 so as to be interposed between leaf spring mounting bracket 910 and leaf spring suspension 950. It may therefore be useful to provide suspension lift kit 100 with engagement mechanisms or elements facilitating securement between leaf spring suspension 950 and mounting bracket 910. An exploded view of the embodiment in FIG. 1 is provided in FIG. 2. As revealed in the exploded view of FIG. 2, a common approach for aligning securement of leaf spring suspension 950 to leaf spring mounting bracket 910 is an engagement protrusion in one of leaf spring suspension 950 and leaf spring mounting bracket 910 operably engaging with a cooperating recess in the other of leaf spring suspension 950 and mounting bracket 910. Most typically, an engaging protrusion, in the form of leaf spring guide post 960 extends from a lower surface of leaf spring suspension 950 in order to operably engage within a corresponding recess 920 (not shown) in mounting surface 912 of leaf spring mounting bracket 910. To aid in the securement and alignment of suspension lift kit 100 between leaf spring suspension 950 and leaf spring mounting bracket 910, an engaging protrusion in the form of a positioning guide post 640 may extend from a lower surface 602 of second suspension lift component 600 to cooperatively engage with axle mounting bracket recess 920 in axle mounting bracket 910. Therefore, positioning guide post 640 may be configured to operably engage within recess 920 for alignment and securement purposes. In like manner, first suspension lift component 102 may be provided with a locating recess 151 in upper surface 150 to operably receive leaf spring guide post 960 therein for guiding and securement purposes. Suspension lift kit 100 may be secured in place between leaf spring suspension 950 and leaf spring mounting bracket 910 with the use of, for example, U-bolts 1000 with securing nuts 1010.

Figure 3:
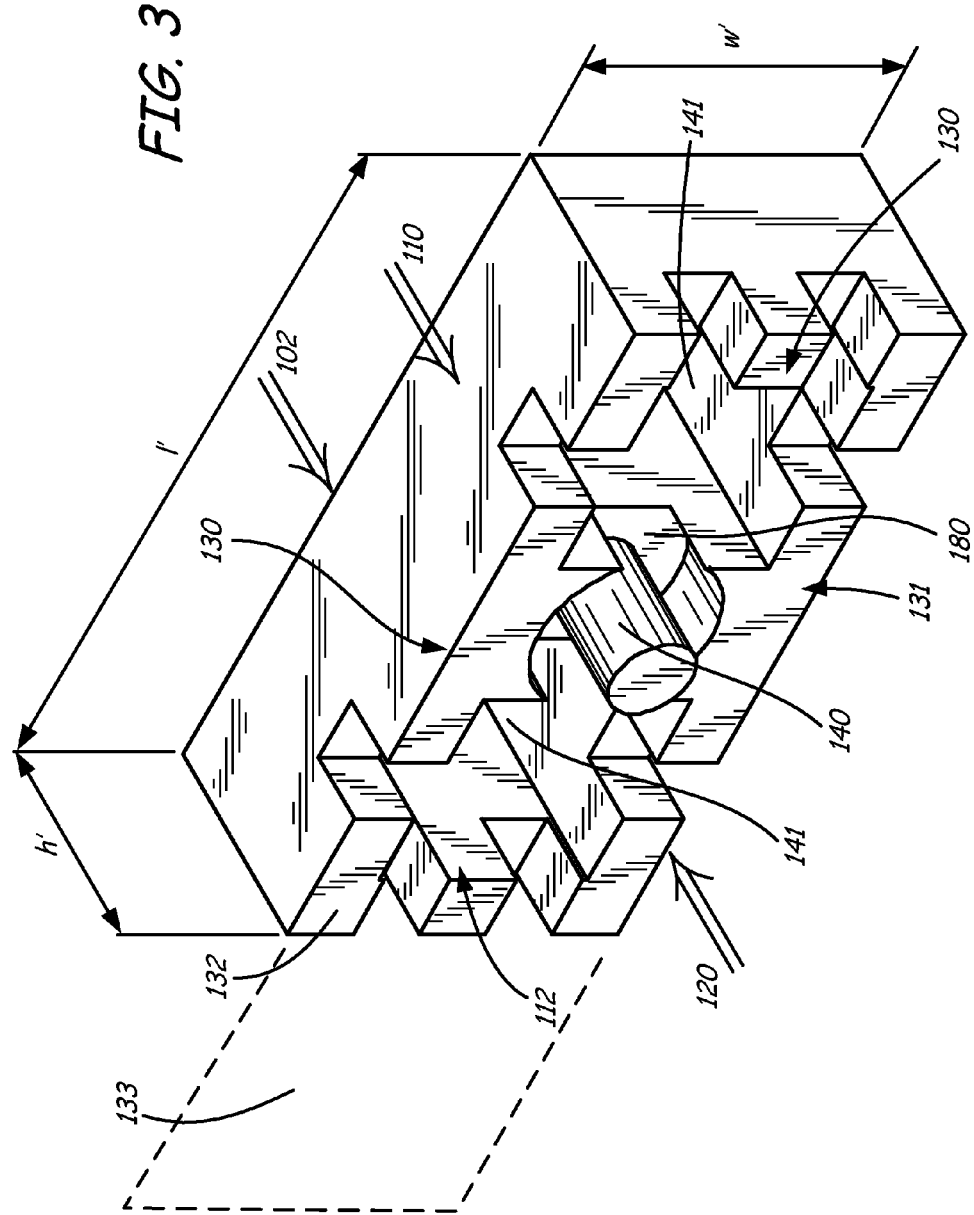
FIG. 3 is a bottom perspective view of an exemplar embodiment of a first component of the suspension lift kit illustrated in FIG. 1.

Referring to FIG. 3, a first exemplar suspension lift component 102 comprises a first body 110. The first exemplar suspension lift component body 110 is generally parallelpiped in shape with height "h'", width "w'", and length "l'" dimensions. The invention, however, anticipates any geometric shape for body 110 that satisfies the functional characteristics described herein. Such shapes may include, but are not limited to, a cube, a cylinder, a truncated square pyramid, a truncated right pyramid, and the like.

The first body 110 comprises a positive interlock bottom side 120 including a first interlocking pattern 112 of first recesses 141 and first protrusions 130 of various shapes and sizes distributed throughout at least a portion of the bottom side 120. It should be appreciated that while a specific number and shape of first recesses 141 and first protrusions 130 are illustrated, any pattern useful as described below may be employed.

Illustrated first interlocking pattern 112 includes first protrusions 130 with substantially flat bottom surfaces 131, at least some of which are aligned with one another along a bottom surface plane 133. In the exemplar embodiment, the first protrusions 130 have height and width dimensions of 0.5 inch by 0.375 inch, and a variety of lengths ranging from 0.0438 inch to 2.25 inches, with the "height", "width", and "length" dimensions being measured in the convention designated by height h', width w', and length l' of body 110. Such dimensions are only described to provide context, and are not intended to limit the possible range of sizes for first protrusions 130. The invention anticipates first protrusions 130 of any suitable height, width, and length dimensions that satisfy the performance characteristics of body 110, including as an individually employed suspension lift component between leaf spring suspension 950 and axle housing mounting bracket 910, wherein first body 110, and its protrusions 130, desirably meet the structural requirements for a vehicle suspension system. First protrusions 130 themselves may be provided in any of a variety of configurations useful both for supporting body 110 in interposition between leaf spring suspension 950 and axle housing mounting bracket 910, as well as for interlocking with coordinating recesses in second suspension lift component 600. Therefore, first protrusions 130 may be, for example, pyramidal, truncated pyramidal, cylindrical, and the like, and may not be all aligned along bottom surface plane 133. In one embodiment, bottom surfaces 131 of first protrusions 130 collectively define a first platform 132 along bottom surface plane 133 that is of sufficient surface area to support first body 110 in operation as a spacer between leaf spring suspension 950 and axle housing mounting bracket 910. In one embodiment, platform 132 may be required to stably support a significant degree of force without operationally detrimental deformation or failure. Such force may be generated as a result of a substantial portion of a vehicle weight being placed upon the interface between leaf spring suspension 950 and axle housing 900. As a result, first body 110 is typically manufactured from a strong and rigid material, and is configured with a first platform 132 of sufficient surface area to support the pressures described above without operationally detrimental deformation or failure of first body 110.

In one embodiment, first platform 132 of first body 110 assumes a total surface area along bottom surface plane 133 of about 5 in$^2$, which represents about 40% of a total possible surface area along bottom surface plane 133. It has been determined by the Applicant that first platform 132 may preferably have a total surface area of at least about 25% of the total possible surface area along bottom surface plane 133, and more preferably at least about 40% thereof.

Figure 6:
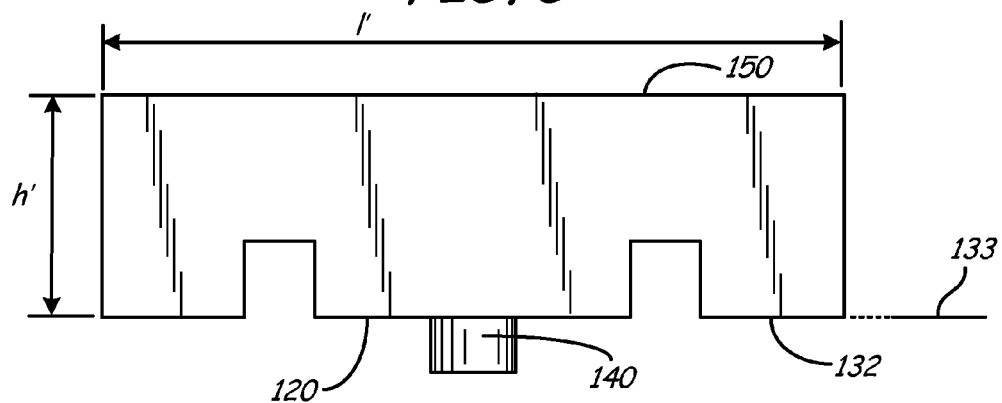
FIG. 6 is a side elevational view of the component illustrated in FIGS. 3-5.
Figure 7:
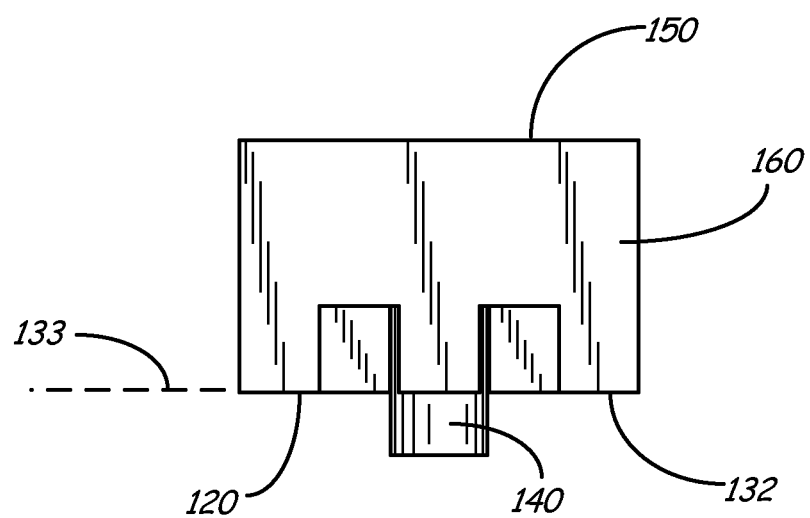
FIG. 7 is an end elevational view of the component illustrated in FIGS. 3-6.
Figure 8:
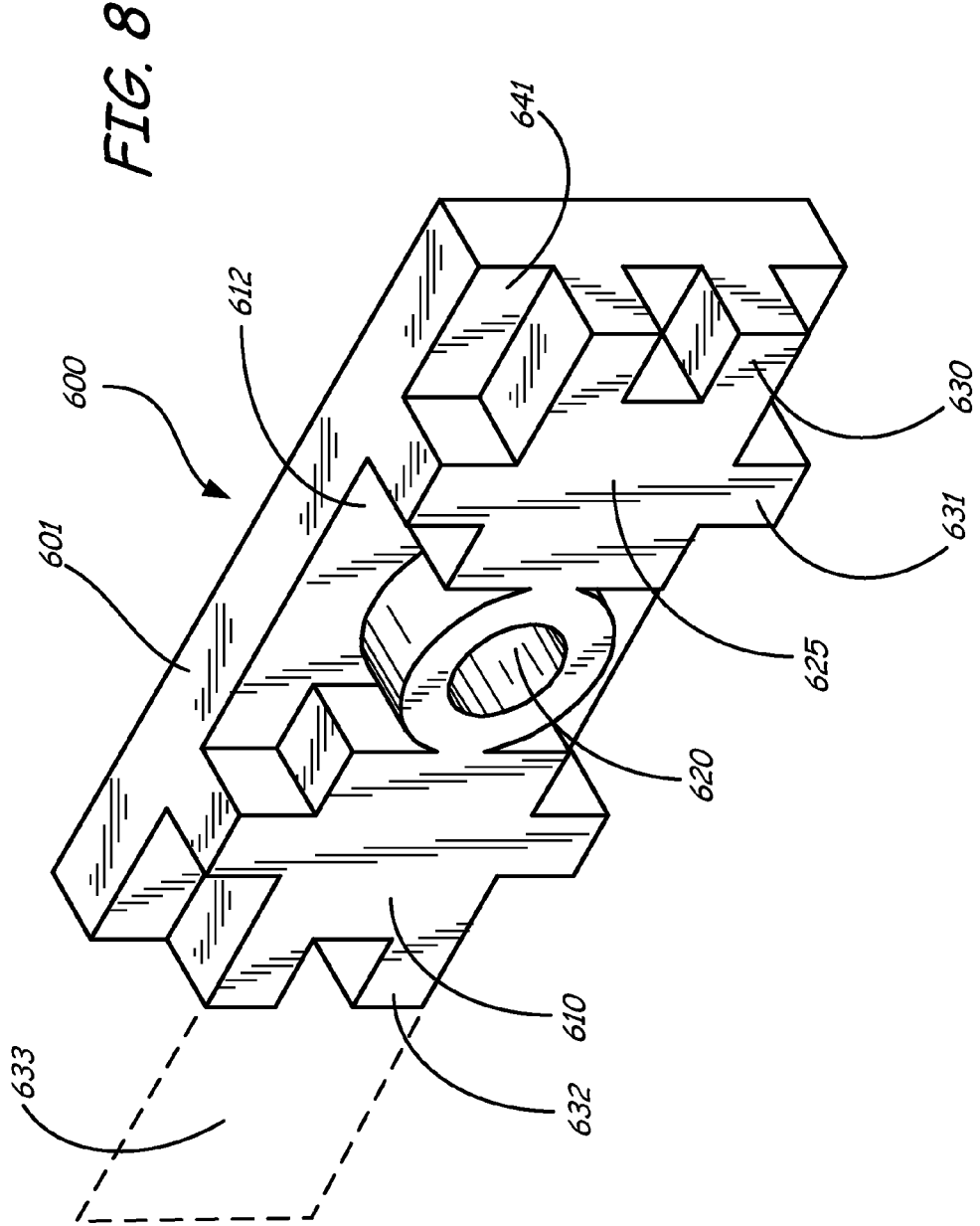
FIG. 8 is a top perspective view of an exemplar embodiment of a second component of the suspension lift kit illustrated in FIG. 1.
Figure 9:
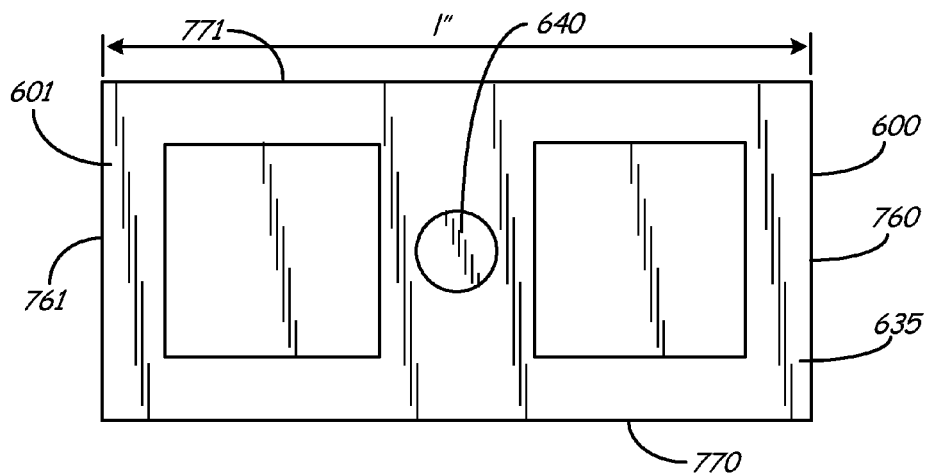
FIG. 9 is a bottom plan view of the component illustrated in FIG. 8.
Figure 10:
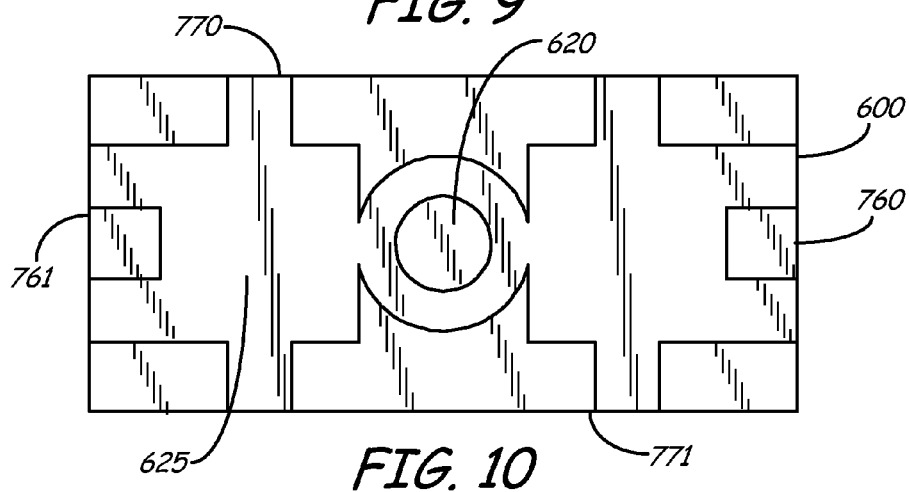
FIG. 10 is a top plan view of the component illustrated in FIGS. 8 and 9.
Figure 11:
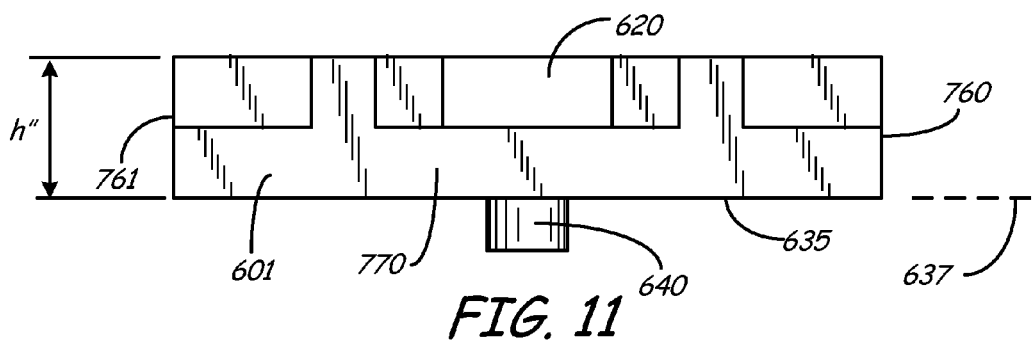
FIG. 11 is a side elevational view of the component illustrated in FIGS. 8-10.
Figure 12:
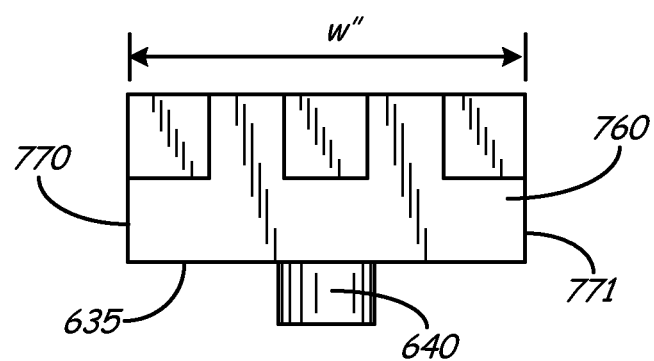
FIG. 12 is an end elevational view of the component illustrated in FIGS. 8-11.

Interlocking bottom side 120 further comprises a first positioning guide post 140. The first positioning guide post 140 may extend downward and beyond the bottom surface plane 133 (see FIGS. 6 and 7), so as to define an engaging protrusion for operably engaging within recess 920 of leaf spring mounting bracket 910, or within recess 620 of second suspension lift component 600. In some embodiments, positioning guidepost 140 may be substantially cylindrical with a cross-sectional diameter of about 0.5 in, and extending downwardly beyond bottom surface plane 133 by about 0.5 in. It is to be understood, however, that first body 110 is not limited to the illustrated configuration of positioning guide post 140, and is also not limited to only a single engaging protrusion for engaging a selective one of leaf spring mounting bracket 910 or second suspension lift component 600.

First lift component body 110 also comprises a top side 150 (shown in FIGS. 4 and 5), which includes a recess 151 for operably receiving leaf spring positioning guide post 960, located on, and in association with, a vehicle leaf spring suspension 950. As described above, leaf spring guide post 960 may connect with first lift component body 110 by engaging within recess 151 to align leaf spring suspension 950 with first body 110, and to inhibit undesired displacement of the first body 110 when the assembly is complete. Recess 151 is therefore preferably configured to matingly engage with guide post 960.

The first lift component body 110 also comprises two end surfaces 160 and 161, and two side surfaces 170 and 171.

Figure 4:
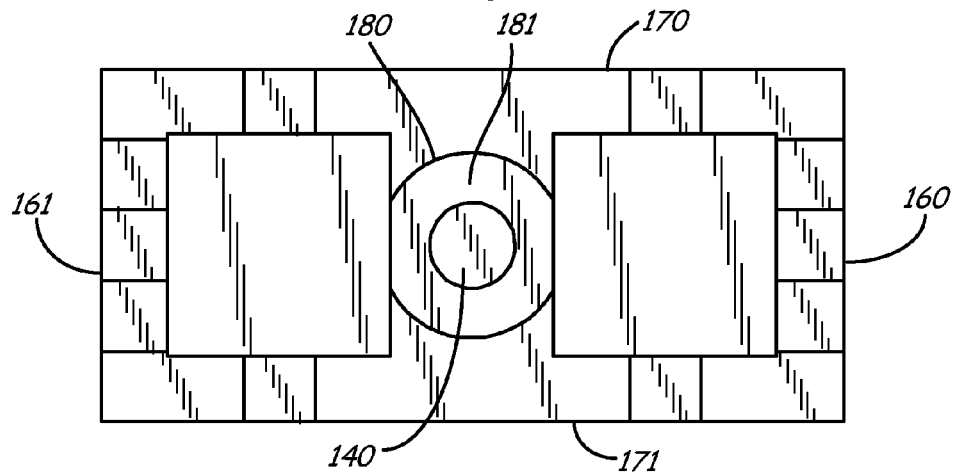
FIG. 4 is a bottom plan view of the component illustrated in FIG. 3.
Figure 5:
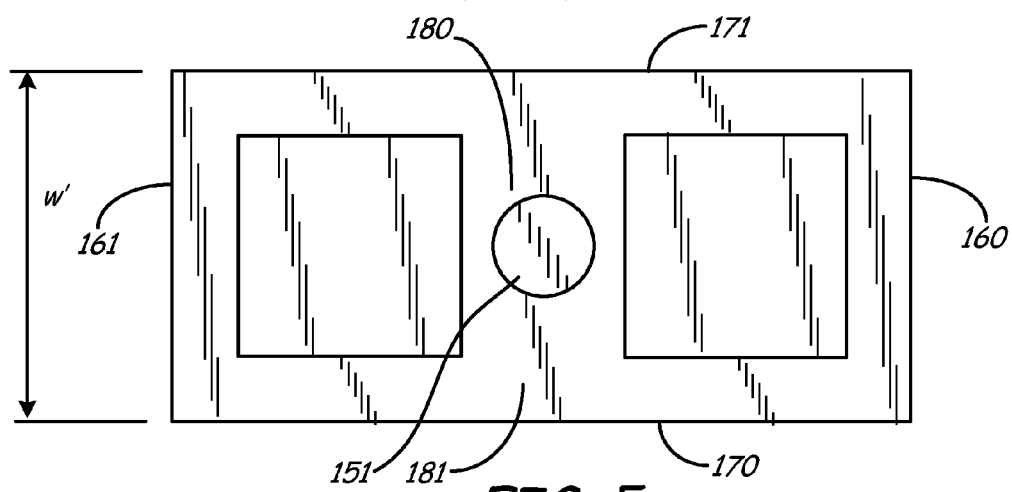
FIG. 5 is a top plan view of the component illustrated in FIGS. 3 and 4.

Referring to FIGS. 4 and 5, a middle portion 180 of the first lift component body 110 is disposed between the two sides (170 and 171) and two ends (160 and 161). The middle portion 180 may be formed as a member that is partially open containing a single stiffening rib 181. The middle portion 180 may optionally be formed as a solid region without ribs or more than one stiffening rib. Such alternative configurations may increase the load bearing capacity of the suspension lift component 102 and may serve to reduce twisting or flexing by the first suspension lift component 102.

The exemplar first suspension lift component body 110 may preferably be made from milled aluminum. However, the invention anticipates the use of cast steel or other metals possessing similar strength characteristics. The invention also anticipates the use of non-metal materials that have suitable strength characteristics.

Referring to FIGS. 8-12, exemplar second suspension lift component 600 comprises a second body 601. The second exemplar suspension lift component body 601 is generally parallelpiped in shape with height "h", width "w", and length "l" dimensions. The invention, however, anticipates any geometric shape for second body 601 that satisfies the functional characteristics described herein. Such shapes include, but are not limited to, a cube, a cylinder, a truncated square pyramid, a truncated right pyramid and the like. Second body 601 is configured to coordinate with first body 110 of suspension kit 100.

Second exemplar body 601, comprises a receiving interlock top side 610, which includes a second interlocking pattern 612 of second recess 641 and second protrusions 630. Among second protrusions is a first raised central region 625 that is specifically configured to cooperatively engage with central void 141 of the first exemplar suspension lift component 100. Second interlocking pattern 612 is configured to cooperatively engage with first interlocking pattern 112, wherein first protrusions 130 of first interlocking pattern 112 cooperatively engage with second recesses 641 of second interlocking pattern 612. Likewise, second protrusions 630 of second interlocking pattern 612 of second body 601 cooperatively engage with first recesses 141 of first interlocking pattern 112 of first body 110. Bottom side 120 of first body 110 and top side 610 of second body 601 are therefore specifically configured to removably matingly engage with one another. For example, second recesses 641 may be slightly larger than first protrusions 130 so that first protrusions 130 may operably nest within second recesses 641 of top side 610, and first recesses 141 may be slightly larger than second protrusions 630 so that second protrusions 630 may operably nest within first recesses 141 of bottom side 120 of first body 110.

The illustrated second interlocking pattern 610 includes second protrusions 630 with substantially flat top surfaces 631, at least some of which are aligned with one another along a second surface plane 633. In the exemplar embodiment, second protrusions 630 have a height of about 0.5 in, with the "height" being measured in the convention measured by height h". However, such dimensions are not intended to limit the possible range of sizes of second protrusions 630. In particular, second protrusions 630 may be of any suitable height, width, and length that satisfies the performance characteristics of second body 601, including as an individually employed suspension lift component between leaf spring suspension 950 and axle housing mounting bracket 910, wherein second body 601 meet structural requirements for a vehicle suspension system. Second protrusions 630 themselves may be provided in any of a variety of configurations useful both for supporting second body 601 in interposition between leaf spring suspension 950 and axle housing mounting bracket 910, as well as for interlocking with first suspension lift component 102. As indicated above, second protrusions 630 may be configured and arranged to provide support to second body 601, and particularly to inhibit structural fatigue or failure when utilized as a suspension lift element between leaf spring suspension 950 and axle housing mounting bracket 910. Accordingly, such protrusions 630 desirably withstand a significant amount of force without permitting performance-limiting deformation or failure of second body 601. The upper surfaces 631 of second protrusions 630 aligned along second surface plane 633 constitute an upper platform 632 which selectively bears against respective first recesses 141 in first body 110 (when first and second bodies 110, 601 are used in combination) or against leaf spring suspension 950 (when second body 601 is utilized individually between leaf spring suspension 950 and leaf spring mounting bracket 910). To provide a desirable and stable contact zone, upper platform 632 preferably has a surface area of about 6 in$^2$. In the illustrated embodiment, upper platform 632 has a contact surface area that is about 50% of a total possible surface area along upper surface plane 633. In some embodiments, the surface area of upper surfaces 361 aligned along upper platform 632 may be at least about 25%, and more preferably at least about 40% of a total possible surface area along top surface plane 633.

Figure 13:
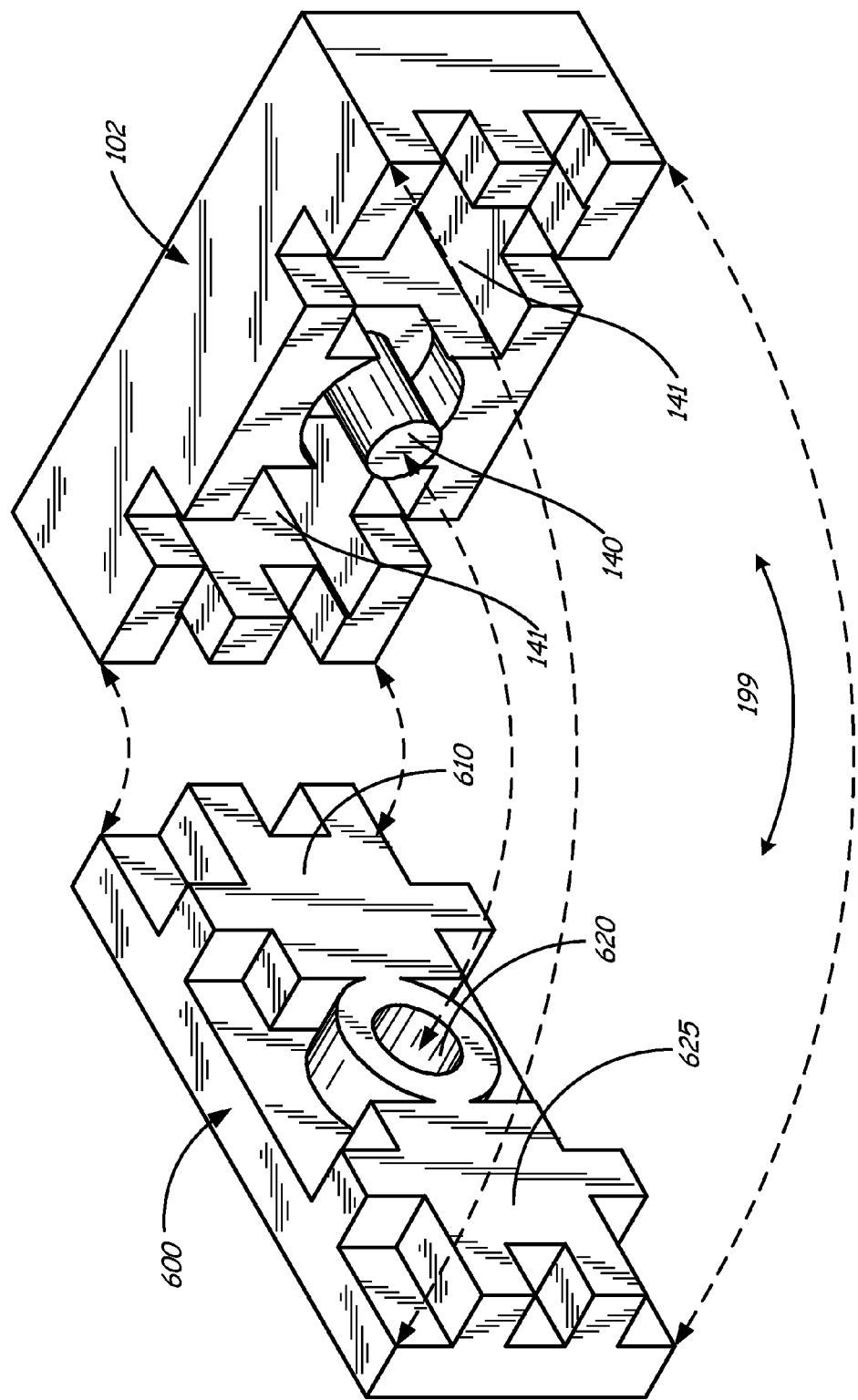
FIG. 13 is an exploded perspective view of the suspension lift kit illustrated in FIG. 1.

A further aspect of the present invention is embodied in the relative configurations of first and second interlocking patterns 112, 612. As described above, such interlocking patterns 112, 612 removably matingly engage with one another to interlock first and second bodies 110, 601. To effectively do so, however, each of first and second interlocking patterns 112, 612, when matingly engaged, desirably eliminate all but one degree of freedom of the combination. Specifically, first and second bodies 110, 601, when engaged, are movable with respect to one another only along a single disengagement direction 199, as illustrated in FIG. 13. The respective configurations of first and second interlocking patterns 112, 612 prevent relative movement among first and second bodies 110, 601 in any direction along interfacial plane 198. Protrusions 130 and 630 of first and second interlocking patterns 112, 612 operably engage with one another to prevent relative motion among first and second bodies 110, 601, other than along a separation direction 199. In this manner, when first and second bodies 110, 601 are interlocked and positioned between leaf spring suspension 950 and leaf spring mounting bracket 910, the vehicular weight placed thereupon prevents not only separation of first and second bodies 110, 601, but also displacement relative to one another. Such an interlocking relationship therefore is tantamount to a single integral body when the assembly is interlockingly positioned between leaf spring suspension 950 and leaf spring mounting bracket 910.

Top side 610 of second body 601 further includes recess 620 for operably receiving a selected one of leaf spring positioning guide post 960 of vehicle leaf spring suspension 950, or first positioning guide post 140 of first body 110. Therefore, leaf spring guide post 960, or first positioning guide post 140, may connect with second lift component body 601 by engaging with recess 620 to align second body 601 therewith, and to inhibit undesired displacement of second body 601 when the assembly is complete. In the event that second body 601 is used individually in its capacity as second suspension lift component 600 between leaf spring suspension 950 and leaf spring mounting bracket 910, leaf spring positioning guide post 960 may be removably matingly engaged within recess 620 for alignment and securement purposes. Such an arrangement is illustrated in the exploded view of FIG. 15.

In the event that first suspension lift component 102 is employed in combination with second suspension lift component 600, first positioning guide post 140 of first body 110 may be operably and removably matingly engagable within recess 620 of second body 601. Such an arrangement is illustrated in the exploded schematic illustration of FIG. 2.

A central void 141 in bottom side 120 of first body 110 is adapted in shape and depth to engage a portion of first interlock top side 610 of second suspension lift component spacer 600 (see FIG. 13). It should be appreciated that while a specific configuration of central void 141 and receiving interlock side 610 is illustrated, any number of configurations may be used to allow for cooperative interlocking of first and second suspension lift components 102, 600. The cooperative interlocking of components 102, 600 is illustrated in FIG. 13. Second exemplar suspension lift component body 601 comprises a bottom side 635, which includes a second positioning guide post 640 extending outwardly from the bottom side 635 and beyond a bottom surface plane 637 (see FIGS. 11 and 12) so as to define an engaging protrusion for operably engaging within recess 920 of leaf spring mounting bracket 910 of the second suspension spacer body 601.

The second suspension spacer body 601 also comprises two end surfaces 760 and 761 and two side surfaces 770 and 771 (see FIGS. 7, 8, 9, and 10).

As described above, the vehicle axle housing 900 possesses a leaf spring mounting bracket 910 to facilitate attachment of the leaf spring suspension 950 to the axle housing 900. The leaf spring mounting bracket 910 is either welded to the axle housing 900 or is integral to the axle housing 900. The leaf spring mounting bracket 910 indicates a flat surface 912 upon which the leaf spring suspension 950 rests. Further, the mounting bracket possesses a recess 920 (not shown) for receiving a leaf spring guide post 960, or in the case of the present invention, one of first or second positioning guide posts 140, 640.

In some embodiments, the leaf spring guide post 960 is positioned at a lower tangent region of the leaf spring suspension 950, and may comprise a bolt head or nut associated with a bolt that holds the individual leaves of the spring suspension together and helps to maintain the leaf spring suspension 950 in proper position relative to the axle housing 900 when the components are secured in place. The leaf spring suspension 950 is secured to the axle housing 900 with multiple U-bolts 1000. The leaf spring 950 are then fastened to the vehicle frame through a series of bushings and bolts (not shown).

Figure 2:
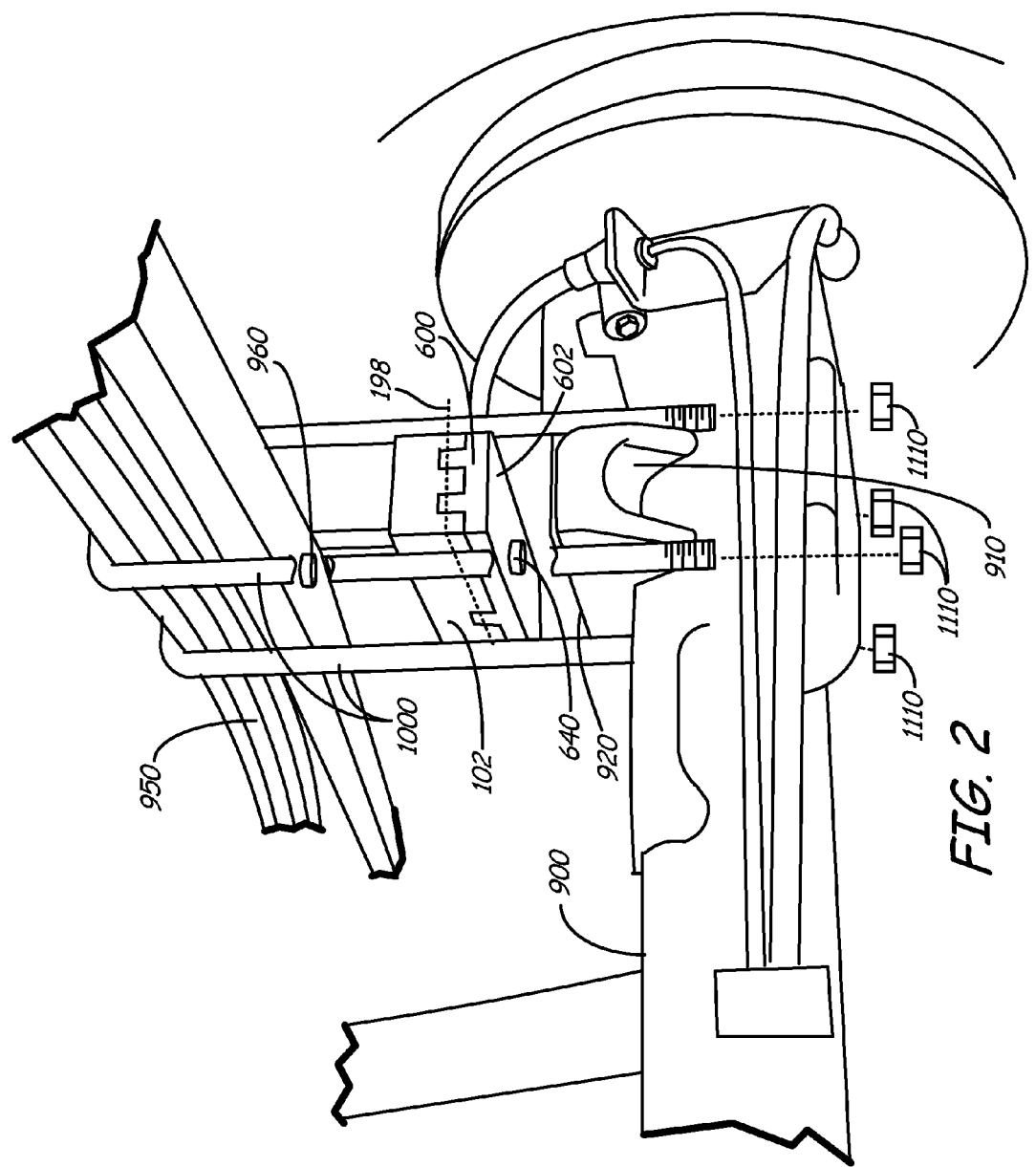
FIG. 2 is an exploded view of the schematic illustration of FIG. 1.
Figure 14:
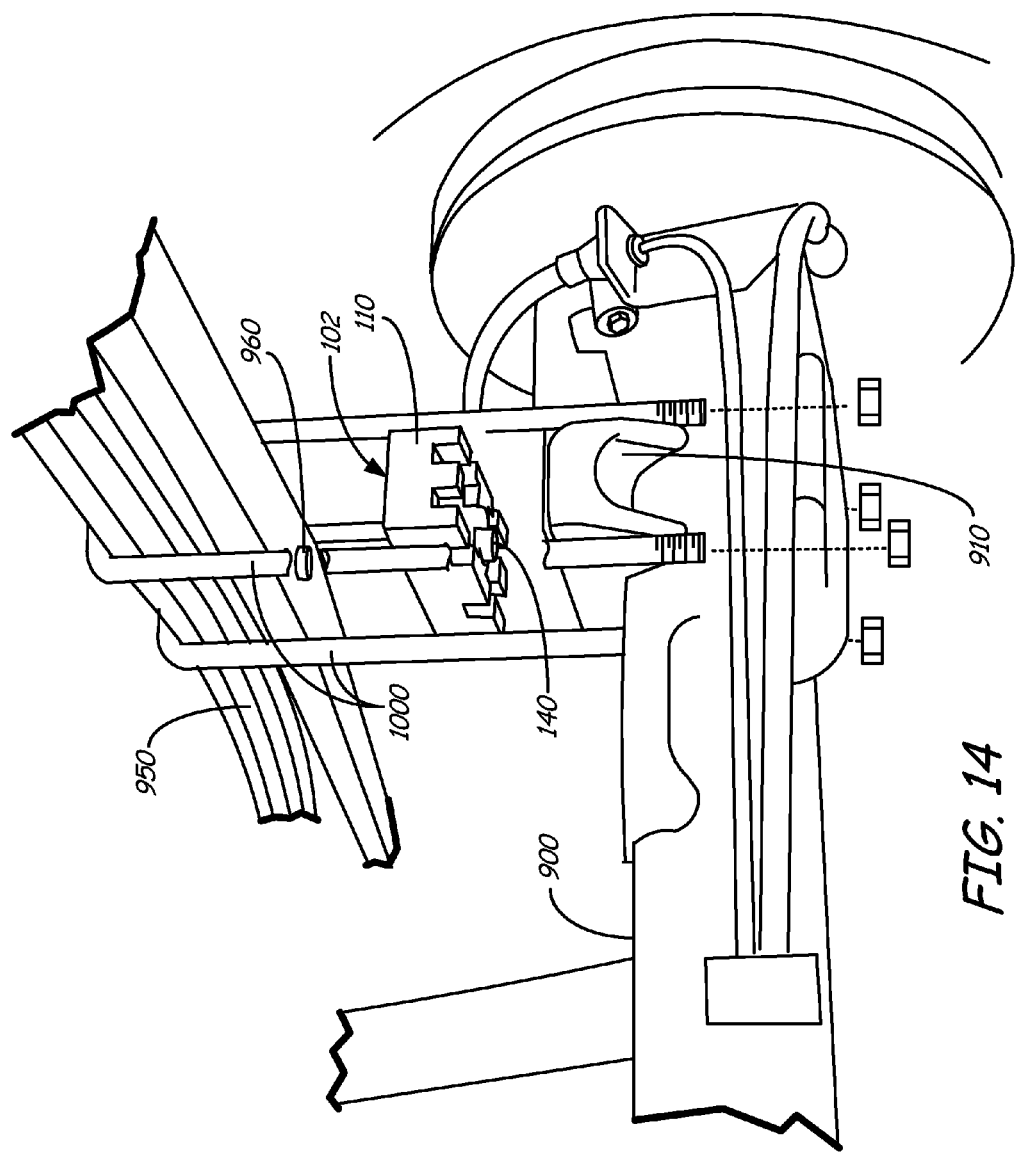
FIG. 14 is an exploded schematic illustration of the first component of the suspension lift kit in position between a vehicle leaf spring suspension and a vehicle wheel axle housing.
Figure 15:
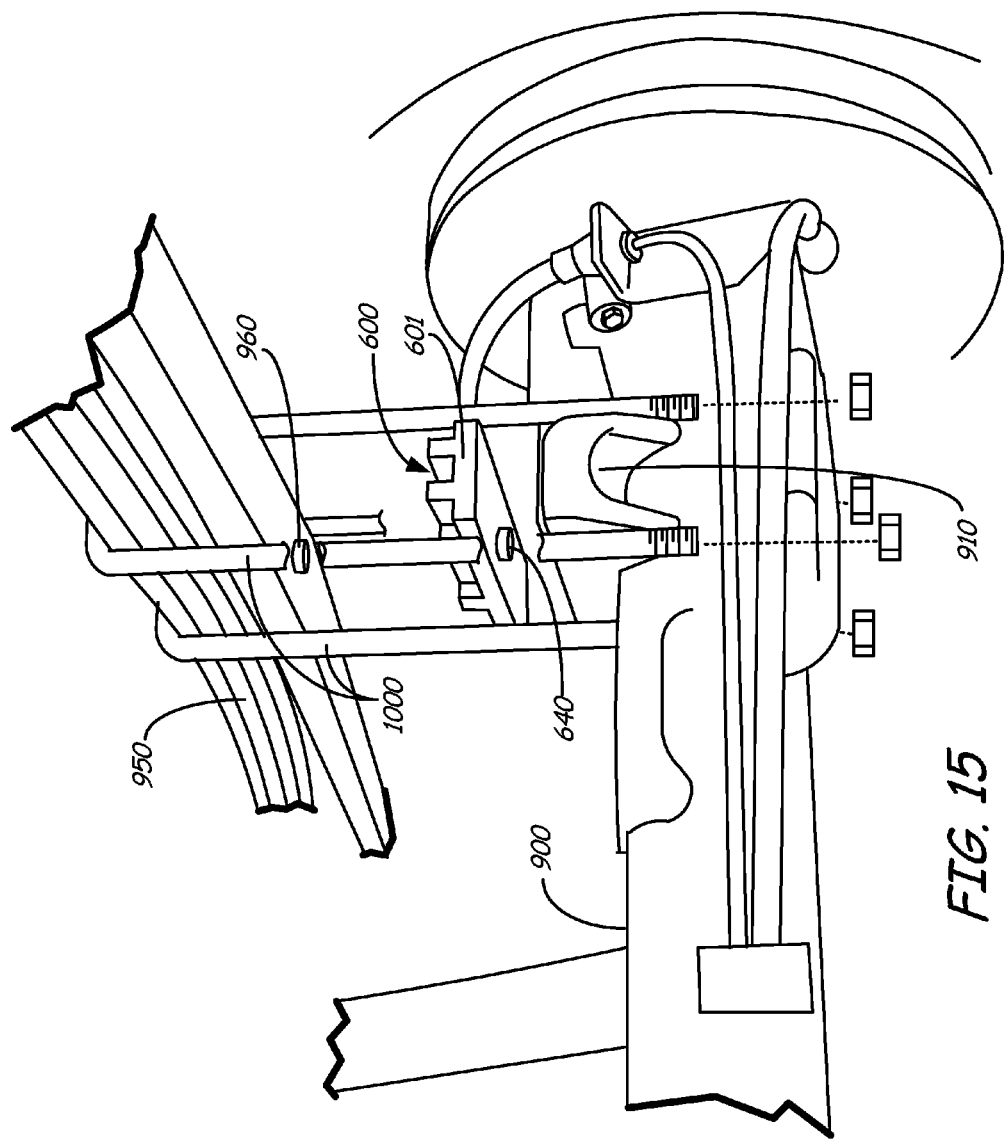
FIG. 15 is an exploded schematic illustration of the second component of the suspension lift kit in position between a vehicle leaf spring suspension and a vehicle wheel axle housing.
Figure 18:
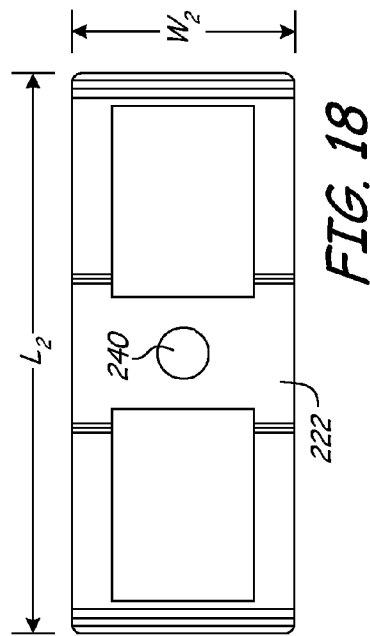
FIG. 18 is a bottom plan view of the component illustrated in FIG. 17.
Figure 19:
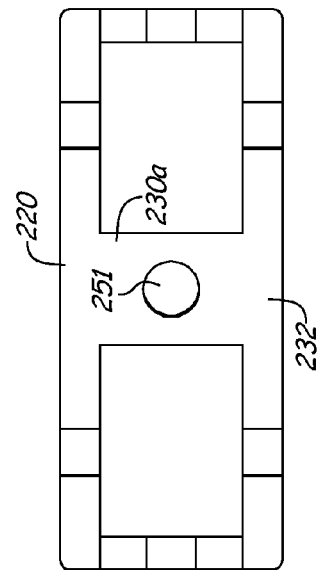
FIG. 19 is a top plan view of the component illustrated in FIGS. 17 and 18.
Figure 17:
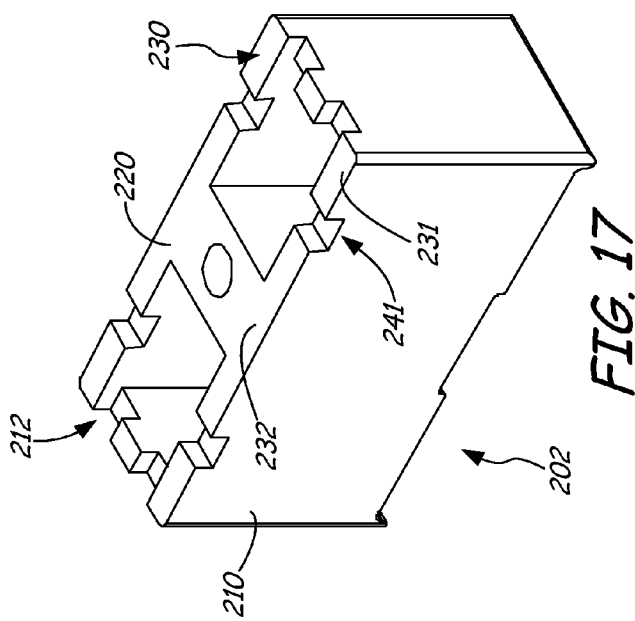
FIG. 17 is a top perspective view of a first component of the suspension lift kit illustrated in FIG. 16.
Figure 35:
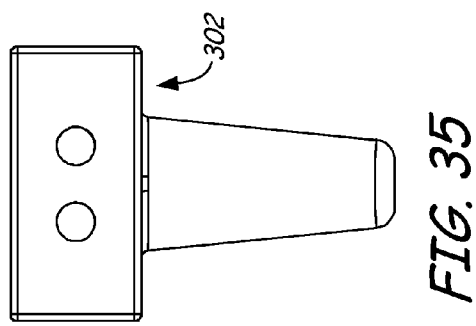
FIG. 35 is a top plan view of the component illustrated in FIGS. 33 and 34.
Figure 38:
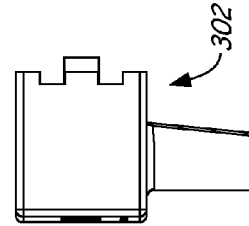
FIG. 38 is an elevational view of the component illustrated in FIGS. 33-37.
Figure 34:
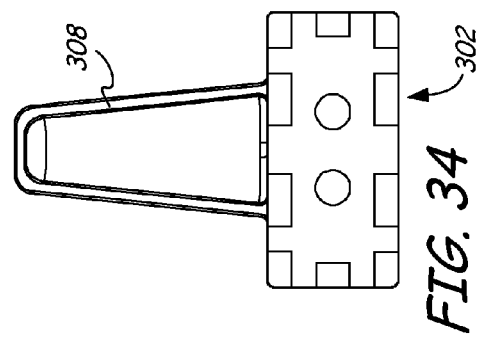
FIG. 34 is a bottom plan view of the component illustrated in FIG. 33.
Figure 37:
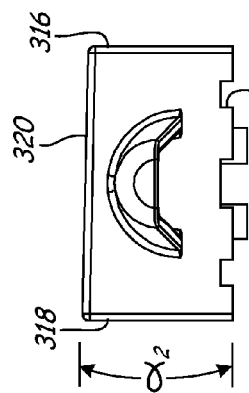
FIG. 37 is a second side elevational view of the component illustrated in FIGS. 33-36.
Figure 33:
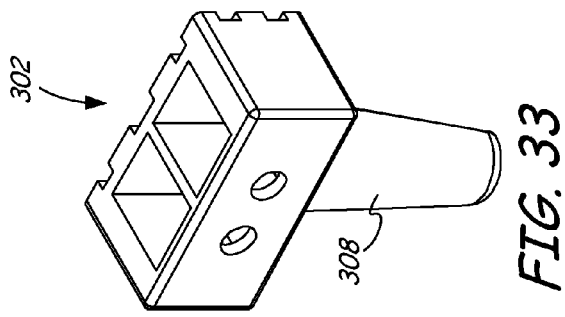
FIG. 33 is a top perspective view of a first component of the suspension lift kit illustrated in FIG. 32.
Figure 36:
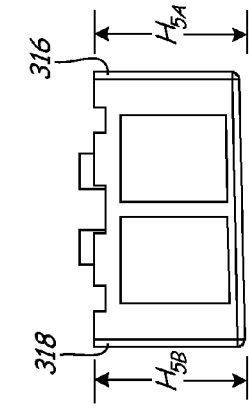
FIG. 36 is a first side elevational view of the component illustrated in FIGS. 33-35.

Installations of respective first and second lift suspension components 102, 600 individually are illustrated in FIGS. 14 and 15, respectively. Therefore, various possible approaches for effectuating a leaf spring suspension lift through the present suspension lift kit 100 is illustrated in FIGS. 1, 2, 14, and 15. In a particular example embodiment, first suspension lift component 102 has a height h' of about 2.5 in, and second suspension lift component 600 has a height dimension of h" of about 1.5 in. The individual application of first suspension lift component 102, as illustrated in FIG. 14, results in this particular embodiment in a suspension lift dimension of about 2.5 in, which corresponds to height dimension h' of first suspension lift component 102. The utilization of second suspension lift component 600 individually, as illustrated in FIG. 15, results in a suspension lift dimension for this particular embodiment of about 1.5 in, which corresponds to the height dimension h" of second suspension lift component 600. Application of both of first and second suspension lift components 102, 600 as illustrated in FIGS. 1 and 2, results in a suspension lift that is less than the sum of the height dimensions h', h" of first and second suspension lift components 102, 600. In this case, first and second interlocking patterns 112, 612 are operably interlocked, wherein first protrusions 130 are engaged with second recesses 641, and second protrusions 630 are engaged in first recesses 141 to accommodate the secure interlock, as described above. Therefore, the combined height dimension $H_1$ of first and second suspension lift components 102, 600 in this particular embodiment is about 2.5 in.

The interlock between first and second suspension lift components 102, 600 described above facilitates the use of a multi-component suspension lift kit for a plurality of distinct suspension lift dimensions. For example, United States governmental regulation through the National Transportation Safety Board (NTSB) prohibit the use of multiple stacked spacers in a suspension lift arrangement wherein such spacers resist relative movement only through frictional contact at their respective contact surfaces. As a result, those wishing to increase suspension height of a leaf spring suspension have previously needed to use a single block spacer with a height dimension that approximates the user's desired extent of suspension lift. If, however, the resultant lift is not to the satisfaction of the user, the spacer block has traditionally needed to be replaced with a completely separate block.

Through the unique arrangement of the interlocking components of the present suspension lift kit, installers may obtain a plurality of distinct lift dimensions with a single apparatus. The unique interlocking of the multiple lift components, which arrests displacement in any direction along interface plane 198, enables the installer to efficiently adjust suspension lift extent with a modular installation approach of one or more of the suspension lift components. It is contemplated, therefore, that installers may employ the suspension lift kit of the present invention to achieve a variety of customizable suspension lift dimensions.

Another embodiment of the invention is illustrated in FIG. 16, wherein suspension lift kit 200 includes first, second, and third lift components 202, 204, 206 that may be used individually or in combination between leaf spring suspension 950 and vehicular axle housing 900 to adjust a distance between axle housing 900 and leaf spring suspension 950. Thus, suspension lift components 202-206 may be used individually or in combination to define a desired lift dimension "$D_1$" between leaf spring suspension 950 and axle housing 900.

First lift component 202 is illustrated in isolation in FIGS. 17-22, wherein first lift component 202 comprises a first body 210 having a length $L_2$, a width $W_2$, and a height that, in the illustrated embodiment, changes from height $H_{2A}$ to height $H_{2B}$ from front end 216 to rear end 218 of first body 210. The increase in height from front to rear ends 216, 218 is illustrated in the side elevational view of FIG. 20. The changing height is an optional feature that may provide more accurate fitment of lift kit 200 between leaf spring suspension 950 and leaf spring mounting bracket 910. In an example embodiment, height $H_{2A}$ at front end 216 may be about 3.1 inches, and height $H_{2B}$ at rear end 218 may be about 3.35 inches, or approximately 0.25 inches greater than the height $H_{2A}$ at front end 216. Such height change results in an angle "$\alpha_1$" of about 2.5°. In such example embodiment, width $W_2$ may be about 2.4 inches, and Length $L_2$ may be about 6 inches. It is to be understood, however, that first body 210 may be provided in a variety of configurations and sizes to best meet the requirements of the specific vehicular suspension being lifted.

First lift component 202 includes a top side 220 and a generally opposed bottom side 222. In some embodiments, as described above, top and bottom sides 220, 222 may not be precisely parallel, and may instead be in somewhat angled relationship to one another, as represented by angle "$\alpha_1$". However, for the purposes hereof, such top and bottom sides are considered to be "generally opposed". Top side 220 of first lift component 202 includes a first interlocking pattern 212 having first protrusions 230 and first recesses 241 of various shapes and sizes distributed throughout at least a portion of top side 220. First lift component 202 includes at least one first protrusion 230 with a first protrusion outer surface 231 that is contained in a first outer plane 233 of top side 220. Height $H_{2A}$, $H_{2B}$ of first lift component 202 is defined between first outer plane 233 and bottom surface 223 of bottom side 222. In the example embodiment, first protrusions include a height dimension $H_{2C}$ of about 0.25 inch, and various width and length dimensions, with the "height", "width", and "length" dimensions being measured in the convention designated by height $H_{2A}$, $H_{2B}$, width $W_2$, and length $L_2$ of first body 210. Such dimensions are only described to provide context, and are not intended to limit the possible range of sizes for first protrusions 230. The invention anticipates first protrusions 230 of any suitable height, width, and length dimensions to satisfy the performance characteristics of body 210, including as an individually employed suspension lift component between leaf spring suspension 950 and axle housing mounting bracket 910, wherein first body 210, and its protrusions 230, desirably meet the structural requirements to support the vehicle weight applied at the point of connection to the vehicle suspension system.

The one or more first recesses 241 of first lift component 202 define a first protrusion wall 238 extending from a first recess surface 237 to first outer plane 233, wherein the first interlocking pattern 212 includes one or more of the first protrusion walls 238.

In some embodiments, outer surfaces 231 of first protrusions 230 collectively define a first platform 232 along first outer plane 233 that is of sufficient surface area to support first body 210 in operation as a spacer between leaf spring suspension 950 and axle housing mounting bracket 910. Platform 232 may be of sufficient size and strength to support the portion of vehicle weight placed at the interface between the leaf spring suspension 950 and axle housing 900 without failure or operationally detrimental deformation. As a result, first body 210 is typically manufactured by a strong and rigid material, and is configured with a first platform 232 of sufficient surface area to support the pressures described above without operationally detrimental deformation or failure of first body 210.

First platform 232 of first body 210 generally comprises the surface area contained in first outer plane 233. Such surface area may be the sum of outer surfaces 231 of protrusions 230 within first outer plane 233. For the purposes of this application, the term "protrusion" may be interpreted to mean any structure extending outward from a center of a respective body to a greater extent than a neighboring structure. In the illustrated embodiment, therefore, protrusions 230 may include all structures at the perimeter of top surface 220 that are separated by first recesses 241, including a central region protrusion 230a. First platform 232 assumes a total surface area along first outer plane 233 of about 6.5 inches, which represents about 45% of a total possible surface area along first outer plane 233 if first body 210 were a solid planar surface throughout the entirety of width $W_2$ and length $L_2$.

Top side 220 may further include a receptacle 251 that is configured to operably receive leaf spring positioning guidepost 960 located on, and in associated with, a vehicle leaf spring suspension 950. Receptacle 251 may therefore be configured to matingly engage with guidepost 950 (or alternatively with guideposts of other components of lift kit 200). Bottom side 222 includes a first positioning guidepost 240 to define an engaging protrusion for operably engaging within receptacle 920 of leaf spring mounting bracket 910, or within a cooperative receptacle of other components of lift kit 200. In the illustrated embodiment, first positioning guide post 240 extends beyond bottom surface 223 by a dimension suitable to provide locating engagement of first lift component 202 with leaf spring mounting bracket 910, or with another component of lift kit 200. Receptacle 251, as described above, is configured to cooperatively receive a guidepost configured similarly to first positioning guidepost 240.

Bottom surface 223 may include a total surface area coplanar with bottom surface plane 223a of about 9 inches to provide a stable base upon which to bear a substantial portion of the vehicular weight. Locating ridges 225 are provided at bottom side 222 to locate first body 210 at, for example, leaf spring mounting bracket 910 in an appropriate orientation. Such locating ridges 225 are intended to be complimentary of the bearing surface of bottom surface 223, and not to support the operating weight of the vehicle solely at locating ridges 225. Preferably, therefore, some or none of the vehicular weight is supported at locating ridges 225, and preferably substantially all of the portion of the vehicular weight is supported by, for example, bottom surface 223 of first body 210.

First lift component 202 includes first and second sides 242, 243 extending between top side and bottom side 220, 222.

Second lift component 204 of lift kit 200 includes upper and lower generally opposed sides 260, 262, with bottom side 262 including a second interlocking pattern 264 having one or more second protrusions 266 separated by one or more second recesses 268. One or more of second protrusions 266 include a second protrusion outer surface 269 that is contained in a second outer plane 271 of bottom side 262 of second lift component 204. As illustrated in FIGS. 23-25, second lift component 204 includes a height $H_3$, a width $W_3$, and a length $L_3$. Second lift component 204 is preferably configured to coordinate with one or more of first and third lift components 202, 206.

Among the second recesses 268 is a central region 268a that is specifically configured to cooperatively engage with central region protrusion 230a of first lift component 202. Such cooperative engagement is a portion of the cooperative engagement of second interlocking pattern 264 with first interlocking pattern 214 of first lift component 202. The one or more second recesses 268 define second protrusion walls 270 of respective adjacent second protrusions 266, which second protrusion walls 270 extend from a second recess surface 272 to the second outer plane 271, defining the bottom surface 269 of the respective second protrusion 266. The cooperative engagement of the first and second interlocking patterns 212, 264 involves the first protrusion wall 238 interacting with a respective second protrusion 266, and the second protrusion wall 270 interacting with a respective first protrusion 230 to prevent relative motion among the first and second lift components 202, 204 along an interfacial plane parallel to the first and second outer planes 233, 271. Bottom side 262 of second lift component 204 and top side 220 of first lift component 202 are specifically configured to removably matingly engage with one another. For example, second recesses 268 may be slightly larger than first protrusions 230 so that first protrusions 230 may operably nest within second recesses 268 of bottom side 262, and first recesses 241 may be slightly larger than second protrusions 266 so that second protrusions 266 may operably nest within first recesses 241 of top side 220 of first lift component 202.

In an example embodiment, second lift component 204 has a height $H_3$ of about 0.75 inch, with second protrusions 266 having a height $H_{3A}$ of about 0.25 inch, wherein height dimension $H_{3A}$ is measured between second recess surface 272 and an outer surface of second protrusion 266, such as second plane 271. Such dimensions, however, are not intended to limit the possible range of sizes of second protrusions 266. The mating engagement of first and second lift components 202, 204 results in a combined third height that is less than the sum of the height dimensions $H_{2A}$, $H_{2B}$ and $H_3$ of first and second lift components 202, 204, due to the "nesting" of protrusions and recesses, as described above.

In similarity to lift kit 100 described above, first and second interlocking patterns 212, 264 removably matingly engage with one another to interlock first and second lift components 202, 204. Such mating engagement preferably eliminates all but one degree of freedom of the combination. Specifically, first and second lift components 202, 204, when engaged, are relatively movable only along a single disengagement direction, while the first and second interlocking patterns 212, 264 prevent relative movement of first and second lift components 202, 204 in any direction along the interfacial plane.

Second lift component 204 may further include a receptacle 276 for operably receiving a selected one of leaf spring positioning guidepost 960 of vehicle leaf spring suspension 950, or a positioning guidepost of another component of lift kit 200. Such engagement of a guidepost within receptacle 276 may inhibit undesired displacement of second lift component 204 when the assembly is complete. In the event that second lift component 204 is used individually in its capacity as a suspension lift element between leaf spring suspension 950 and leaf spring mounting bracket 910, leaf spring positioning guidepost 960 may removably cooperate within receptacle 276 for alignment and securement purposes.

Outer surfaces 269 of second protrusions 266 contained in second plane 271 form a platform 275. In the illustrated embodiment, platform 275 includes a surface area of about 8.3 in$^2$, which represents about 58% of the total theoretical surface area of bottom side 262 of second lift component 204 with a solid planar surface along second plane 271.

Third lift component 206 is illustrated in FIGS. 27-31, and includes upper and lower generally opposed sides 280, 282, with lower side 282 including a third interlocking pattern 284 having one or more third protrusions 286 and one or more third recesses 288. The third interlocking pattern 284 is preferably arranged to permit mating engagement with one of the first or second lift components 202, 204. In the illustrated embodiment, third interlocking pattern 284 is matingly engagable with a fourth interlocking pattern 294 at upper side 260 of second lift component 204. The mating engagement between third interlocking pattern 284 of third lift component 206 with fourth interlocking pattern 294 of second lift component 204 preferably prevents relative motion among the second and third lift components 204, 206 parallel to the second outer plane 271, and permits only a single degree of freedom of relative motion among second and third lift components 204, 206. Fourth interlocking pattern 294 includes one or more fourth protrusions 296 and one or more fourth recesses 298 at upper side 260 of second lift component 204. One or more of the fourth protrusions 296 include a respective fourth protrusion outer surface 297 that is contained in a fourth outer plane 291 that is substantially parallel to second outer plane 271.

Third interlocking pattern 284 of third lift component 206, as described above, may be matingly engagable with one or more of first and second lift components 202, 204. In the illustrated embodiment, third interlocking pattern 284 is specifically arranged for mating engagement with fourth interlocking pattern 294 on upper side 260 of second lift component 204. In some embodiments, fourth interlocking pattern 294 of second lift component 204 may be arranged so that third interlocking pattern 284 of third lift component 206 may be compatible and engagable with either of fourth interlocking pattern 294 of second lift component 204 and first interlocking pattern 212 of first lift component 202. In such a manner, third lift component 206 may be utilized in connection with one or both of first and second lift components 202, 204 to satisfy the overall lift dimension for lift kit 200 needed by the user.

As illustrated in FIGS. 27-31, third lift component 206 includes a height $H_4$, a width $W_4$, and a length $L_4$, wherein, in the illustrated embodiment of lift kit 200, length $L_4$ is about 6 inches, width $W_4$ is about 2.4 inches, and height $H_4$ is about 0.75 inch, with the height $H_{4A}$ of third protrusion walls 287, as measured between third recess surface 289 and a third outer plane 281 containing an outer surface 285 of third protrusions 286 being about 0.25 inch. In the same manner as described above with respect to first and second lift components 202, 204, engagement of third lift component 206 with a respective one of first or second lift components 202, 204 results in a "nesting" of third protrusions 286 within the respective interlocking pattern recesses of first or second lift components 202, 204. Such "nesting" results in an effective height addition of about 0.5 in. ($H_4$–$H_{4A}$) when third lift component 206 is utilized in combination with first or second lift components 202, 204 in lift kit 200. However, if used individually, the effective lift height provided by third lift component 206 is $H_4$, or in the illustrated embodiment, about 0.75 in.

To accommodate a positioning guidepost of leaf spring suspension 950 or another lift component, a receptacle 299 is provided at third lift component 206. In some embodiments, receptacles 299, 276, and 251 of lift kit 200 operably axially align when the respective lift components 202-206 are matingly engaged at their respective interlocking patterns.

Another embodiment of the invention is illustrated in FIG. 32, wherein lift kit 300 includes first lift component 302, second lift component 304, and third lift component 306 that are selectively engagable with one another in a similar manner to that described above with respect to lift kits 100, 200. As illustrated in the isolation views of first lift component 302 in FIGS. 33-38, a bump stop 308 may optionally be included as a contact point or limit to downward motion of a vehicular suspension, such as in the event that the vehicle is loaded with substantial weight. Bump stop 308 typically is employed as a replacement to an original equipment of manufacture (OEM) spring block that is replaced by lift kit 300.

First lift component 302 may also be orientationally configured with a first height $H_{5A}$ at front end 316 being slightly smaller than height $H_{5B}$ at rear end 318. The height difference may result in an angled relationship between first side 320 and second side 322, with the angle being represented by "$\alpha_2$". In the illustrated embodiment, angle $\alpha_2$ may be about 1.25°.

First, second, and third lift components 302-306 of lift kit 300 also include a plurality of receptacles/guideposts for each component. Such an arrangement is to accommodate OEM suspension components in the vehicle. For example, certain vehicles may include a plurality of positioning guideposts 960 at each leaf spring suspension 950. To accommodate such multiplicity of OEM leaf spring positioning guideposts, the components 302-306 of lift kit 300 include a correspondingly-configured receptacles and positioning guideposts to assist in the accurate installation of lift kit 300 at the vehicle leaf spring suspension 950.

Second and third lift components 304, 306 preferably are configured to be complementary with each other and with first lift component 302, so as to operate as described above with respect to lift kits 100, 200.

Figure 49:
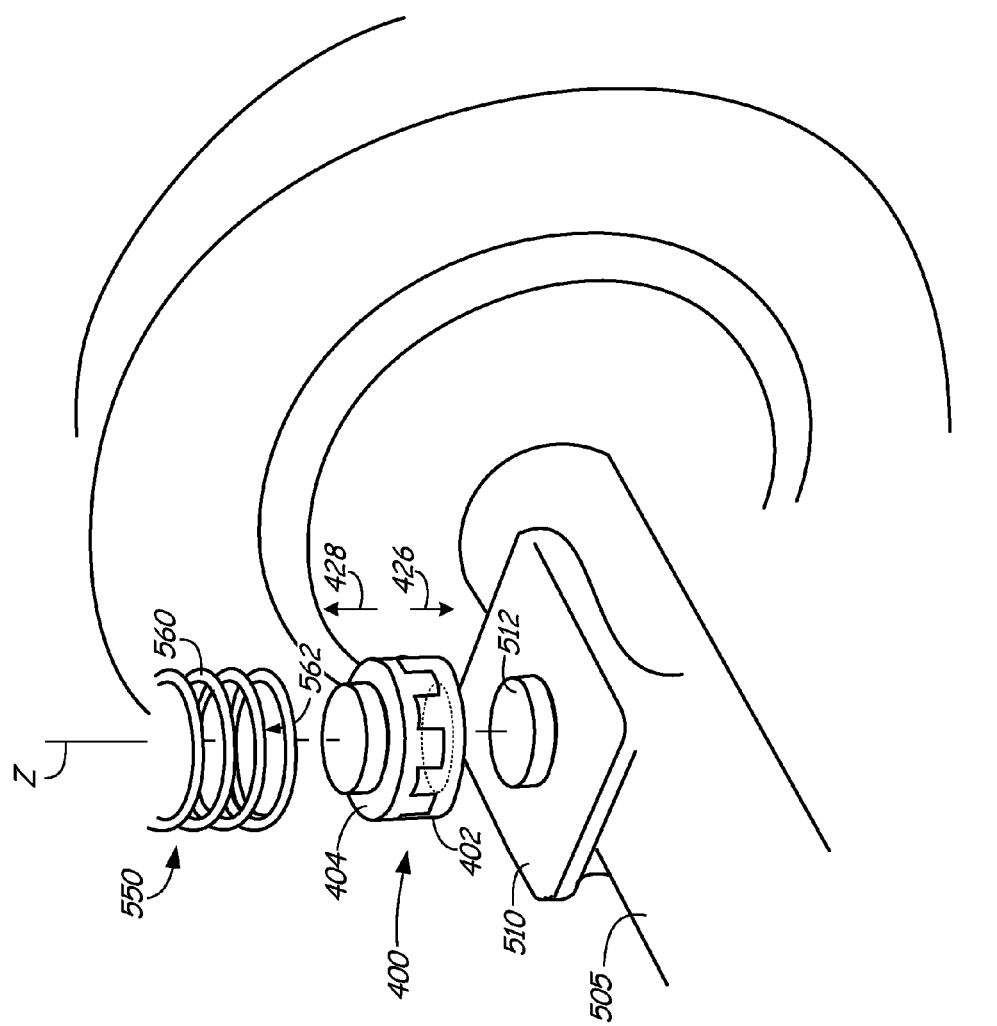
FIG. 49 is an exploded schematic view of a suspension lift kit of the present invention.
Figure 51:
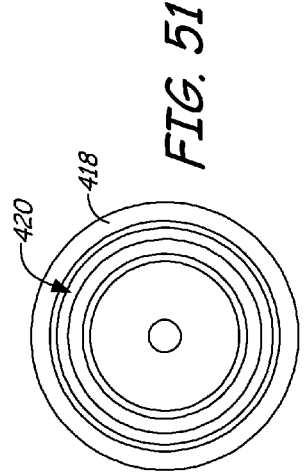
FIG. 51 is a bottom plan view of the component illustrated in FIG. 50.
Figure 53:
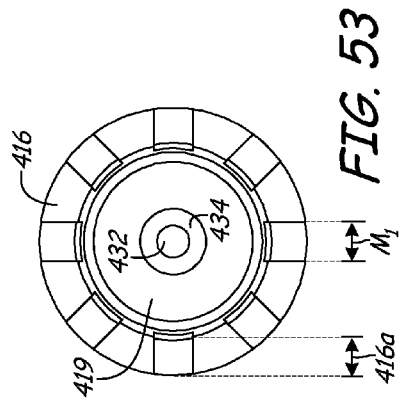
FIG. 53 is a top plan view of the component illustrated in FIGS. 50-52.
Figure 54:
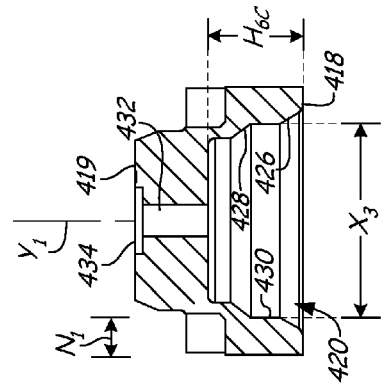
FIG. 54 is a side elevational cross-sectional view of the component illustrated in FIGS. 50-53.
Figure 50:
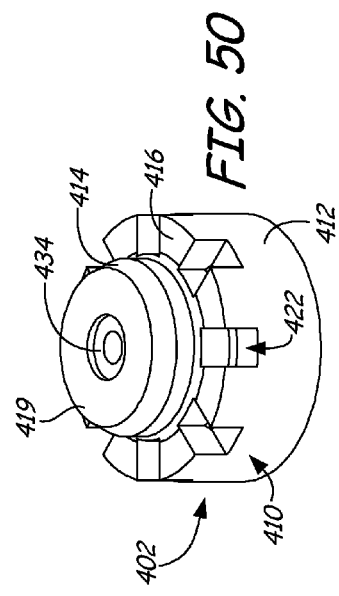
FIG. 50 is a top perspective view of a first component of the suspension lift kit illustrated in FIG. 49.
Figure 52:
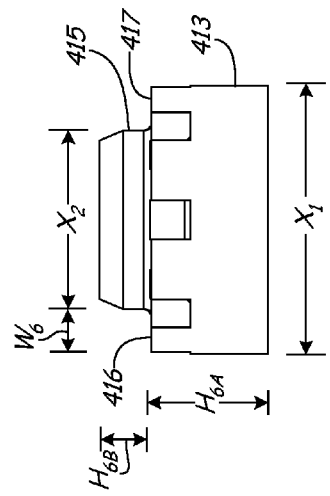
FIG. 52 is a side elevational view of the component illustrated in FIGS. 50-51.

Another embodiment of the invention is illustrated in FIG. 49, wherein suspension lift kit 400 includes at least first and second lift components 402, 404 that may be used individually or in combination between a coil spring suspension 550 and a vehicular axle 505, and particularly coil spring mounting platform 510, to adjust a distance between an axle 505 and the coil spring suspension 550. Suspension lift kit 400 may be specifically arranged for use in connection with coil spring suspension 550, as illustrated in FIG. 49. In a similar manner to the leaf spring suspensions described hereinabove, coil spring suspension 550 is typically secured between a vehicular axle assembly 505 and the vehicle frame (not shown) to interface and dampen movement between the axle assembly 505 and the frame. In some embodiments, coil spring suspension 550 may be in a "strut" arrangement, with the coil spring 560 substantially coaxially arranged about a shock absorber (not shown), wherein the shock absorber further dampens movement between the axle assembly 505 and the frame. In many motorized vehicles produced today, coil springs suspensions 550, including strut-type suspensions, are widely employed in automotive applications, as well as off-road vehicle applications.

First lift component 402 comprises a first body 410 having a first base portion 412, a first alignment portion 414 and a first shoulder portion 416 between first base portion 412 and first alignment portion 414. In the illustrated embodiment, first base portion 412 and first alignment portion 414 are substantially cylindrically-shaped portions coaxially arranged about a first center axis $Y_1$, with first base portion 412 having a first base diameter $X_1$ that is larger than a first alignment diameter $X_2$, with the difference defining a width dimension $W_6$ of first shoulder portion 416. It is to be understood, however, that any one of first base portion 412 and first alignment portion 414 may be non-cylindrical, and such portions may not be coaxially-aligned. Moreover, first shoulder portion 416 may present a shoulder surface 417 that is perpendicular or non-perpendicular to outer circumferential surfaces 413, 415 of first base portion 412 and first alignment portion 414, respectively.

First base portion 412 includes a first base height $H_{6A}$ while first alignment portion 414 includes a first alignment height $H_{6B}$. When used alone as a means for lifting a coil spring suspension, first base height $H_{6A}$ of first lift component 402 represents the lift height provided by first lift component 402. Such lift height is accomplished by coil spring 560 of coil spring suspension 550 being operably positionable upon shoulder surface 417 of first shoulder portion 416, and coil spring 560 annularly extending about first alignment portion 414. In some embodiments, first alignment diameter $X_2$ of first alignment portion 414 is substantially equivalent to an inner diameter of coil spring 560, such that coil spring 560 may be appropriately located at first shoulder portion 416 by receiving first alignment portion 414 within axial end opening 562 of coil spring 560. Outer circumferential surface 415 of alignment portion 414 may contact coil spring 560 as a positive engagement between first alignment portion 414 and coil spring 560.

First lift component 402, in the manner described above, replicates the functionality of coil spring mounting platform 510, in which alignment portion 512 acts as a locator in the mounting of coil spring 560 to coil spring mounting platform 510.

To be efficiently adaptable with coil spring mounting platform 510, first and second lift components 402, 404 of suspension lift kit 400 may be configured with a central recess or aperture, so as to fit over alignment portion 512 of coil spring mounting platform 510 and to securely and appropriately align suspension lift kit 400 at coil spring mounting platform 510. First base receptacle 420 may include a first receptacle diameter $X_3$ that is substantially equal to, but slightly larger than a diameter of alignment portion 512 of coil spring mounting bracket 510. Moreover, first recess diameter $X_3$ may be substantially equal to, but slightly greater than first alignment diameter $X_2$, in that first alignment portion 414 may be similarly configured to alignment portion 512 of coil spring mounting platform 510 so as to mimic the functionality of the OEM coil spring mounting platform 510. First base receptacle 420 may further include a first receptacle height $H_{6C}$ that is substantially equal to a corresponding height dimension of alignment portion 512. In this manner, first base portion 412 of first lift component 402 may be nested over alignment portion 512 of coil spring mounting platform 510.

It is to be understood that the terms "diameter", "circumference", and the like are not intended to limit the configuration of first and second lift components 402, 404 of suspension lift kit 400. For example, outer surfaces 412, 415 need not be cylindrical. First body 410 is preferably arranged to provide a shoulder surface 417 against which coil spring 560 may operably bear, in order to achieve a desired suspension lift dimension. In some cases, such lift dimension may be substantially equivalent to first base height $H_{6A}$, with first base bottom surface 418 in contact with coil spring mounting platform 510. Other arrangements and assemblies for coupling first and/or second lift components 402, 404 to coil spring mounting platform 510 are contemplated by the present invention.

As discernable from the drawings, first body 410 may include first coupling features 422, such as recesses, that are specifically configured for engagement with second coupling features 424 of second lift component 404. Removable engagement of first coupling features 422 with second coupling features 424 facilitates an engagement between first and second lift components 402, 404 that prevents relative motion between first and second lift components 402, 404 in all but one degree of freedom. Specifically, such removable engagement of first and second coupling features 422, 424 prevents relative rotational movement about first center axis $Y_1$, and, when fully engaged, preferably any other relative motion with the exception of a one degree of freedom-relatively opposite axial disengagement movements along first center axis $Y_1$, with first lift component 402 moving in a first axial direction 426 relative to a second axial direction 428 for second lift component 404.

In one example embodiment, first body 410 includes a first base diameter $X_1$ of about 3.5 inches, a first alignment diameter $X_2$ of about 2.3 inches, and a first receptacle diameter $X_3$ of about 2.5 inches. As best viewed in the cross-sectional view of FIG. 55, first base receptacle 420 is preferably configured to receive alignment portion 512 of coil spring mounting platform 510, with first alignment diameter $X_2$ circumferentially engaging about alignment portion 512. In the illustrated embodiment, first base receptacle 420 includes lower and upper chamfered regions 426, 428 which seat upon corresponding beveled surfaces of alignment portion 512. In this manner, first base receptacle 420 "automatically" aligns itself about alignment portion 512 of coil spring mounting platform 510, such that first center axis $Y_1$ is in axial alignment with a central axis Z of coil spring mounting bracket. In such alignment, coil spring 560 may be supported at first shoulder portion 416 of first body 410. Lower and upper chamfered regions 426, 428 bracket receptacle wall 430, which defines first receptacle diameter $X_3$.

In the embodiment of FIGS. 51-55, first coupling features 422 are recesses having a width $M_1$ of about 0.5 inches, a depth $N_1$ of about 0.5 inches, and extend substantially axially along an axial dimension 416A of shoulder portion 416. In the illustrated embodiment, such axial direction 416A is about 0.5 inch. In the illustrated embodiment, shoulder portion 416 includes eight first coupling features 422 of equal size. It is to be understood, however, that various numbers, sizes, and the like of the first coupling features 422 may be employed in the present invention.

This example embodiment of first body 410 includes a first base height $H_{6A}$ of about 1.5 inches, and a first alignment height $H_{6B}$ of about 0.7 inches. The lift height provided by first body 410 is a difference between the total height ($H_{6a}$+$H_{6B}$) and the first base recess depth $H_{6C}$. In the example illustrated embodiment, first base recess depth $H_{6C}$ is about 1.2 inches, such that the lift height $L_1$ is about 1.0 inch.

Therefore, first body 410 may be secured at coil spring mounting platform 510 to add about 1.0 inch of lift height to coil spring suspension 550.

First body 410 may further include a mounting aperture 432, which may be axially arranged along first center axis $Y_1$ through first alignment portion 414. Mounting aperture 432 communicates between upper surface 419 of alignment portion 414 and first base receptacle 420. Mounting aperture 432 may preferably be configured to receive a mounting bolt (not shown) for further securing first body 410 to coil spring mounting platform 510. An upper surface recess 434 may be provided in upper surface 419 circumferentially about mounting aperture 432 to receive a bolt head of the bolt, such that an upper surface of the bolt head is flush with upper surface 419 of first alignment portions 414.

Second lift component 404 of lift kit 400, as described above, may be configured for use in combination with, or independent of, first lift component 402 to lift coil spring suspension 550. Second lift component 404 may accordingly be configured for removable engagement with first lift component 402, for the lifting of coil spring suspension 550 in combination with first lift component 402. Second lift component 404 is also preferably configured to function as a suspension lift device individually, as further described herein.

Second lift component 402 comprises a second body 440 with a second base portion 442 having a second base diameter $X_4$, a second alignment portion 444 a having a second alignment diameter $X_5$, and a second shoulder portion 446 having an axial dimension 446A extending from alignment wall 445 to circumferential base wall 443. Second body 440 further includes a second base height $H_{7A}$ and a second alignment height $H_{7B}$, together forming a total height $H_{7C}$.

Second body 440 includes a second base receptacle 450 having a second receptacle diameter $X_6$ and a second receptacle depth $D_2$. In similar fashion to first base recess 420, second base recess 450 may be configured to receive and operably engage with alignment portion 512 of coil spring mounting platform 510, or with first alignment portion 414 of first lift component 402. Second base receptacle 450 may include lower and upper chamfered regions 452, 454 for coordination with respective beveled surfaces, such as lower and upper beveled surfaces 427, 429 of first alignment portion 414. Such arrangement assists in correctly aligning second body 440 with respect to either alignment portion 512 of coil spring mounting platform 510, or first alignment portion 414 of first lift component 402, as appropriate. Second receptacle wall 456 is disposed between lower and upper chamfered regions 452, 454 and defines second alignment diameter $X_5$. Second receptacle wall 456 coordinates about alignment portion 512 or first base portion 412 to position second body 440 for displacing coil spring 560 from coil spring mounting platform 510, thereby providing a coil spring suspension "lift".

Second body 440 preferably includes second coupling features 424 for cooperative removable engagement with first coupling features 422 of first body 410. In one embodiment, second coupling features 424 represent protrusions which are receivable in the respective recesses of first coupling features 422 to restrict or eliminate degrees of freedom of relative movement between first and second bodies 410, 440. In some embodiments, the cooperative engagement of second coupling features 424 with first coupling features 422 restrict or eliminate relative rotational movement of first and second bodies 410, 440 about first center axis $Y_1$ to one degree of freedom of relative movement between first and second bodies 410, 440. In some embodiments, the cooperative engagement of second coupling features 424 with first coupling features 422 restrict or eliminate relative rotational movement of first and second bodies 410, 440 about first center axis $Y_1$. Such engagement may further restrict or eliminate relative pivoting motion among first and second bodies 410, 440, and also aids in the proper alignment and positioning of second body 440 with respect to first body 410.

One aspect of the present invention is the provision of a second base bottom surface 448 that is defined as the collection of individual second base bottom surfaces 448A of second coupling features 424 that is contained within a base plane $P_1$. The total surface area of second base bottom surface 448 is preferably sufficient to aid in the support of coil spring 560 at coil spring mounting platform 510. As a result, the pattern of second coupling features 424 may be designed to provide significant surface area at second base bottom surface 448 within plane $P_1$.

In similarity to first body 410, second body 440 may include a second mounting aperture 462 for operably receiving a mounting bolt. In some embodiments, the mounting bolt may be inserted through second mounting aperture 462 along first center axis $Y_1$, and secured to coil spring mounting platform 510 in conventional fashion. In an example embodiment, second base portion diameter $X_4$ is about 3.5 inches, second alignment diameter $X_5$ is about 2.4 inches, and second base receptacle diameter $X_6$ is about 2.5 inches. Second base receptacle depth $D_2$ in this example embodiment is about 1.2 inches, and second base height $H_{7A}$ is about 1 inch, with second alignment height $H_{7B}$ is about 0.7 inch. Accordingly, total height $H_{7C}$ of second body 440 in this embodiment is about 1.7 inches. The lift height $L_2$ of second body 440 is the total height $H_{7C}$ less the second base receptacle depth $D_2$. In this example embodiment, therefore, the lift dimension $L_2$ for second body 440 is about 0.5 inches. Used alone as a spacer suspension lift device, therefore, second lift component 404 provides, in the example embodiment, about 0.5 inches of suspension lift. When used in combination with the example embodiment of first lift component 402 described above, the total lift ($L_1+L_2$) is about 1.5 inches. The suspension lift kit 400, therefore, provides the user with the option of lifting coil spring suspension 550 by increments of 0.5 inches, 1.0 inch, and 1.5 inches (in the example embodiments).

In order to cooperatively engage with first coupling features 422, second coupling features 424 are preferably dimensioned with minimal gaps between the engaging features. In the example embodiment of second body 440, the protrusions of second coupling features 424 have a width $M_2$ that is substantially equal to but slightly smaller than width $M_1$ of recesses 422, and may preferably be slightly less than 0.5 inches. Similarly, height $N_2$ of protrusions 424 is about 0.5 inches in this example embodiment. As a result, the protrusions of second coupling features 424 are arranged to operably nest within the recesses of first coupling features 422 to cooperatively engage second lift component 404 with first lift component 402.

It is to be understood that the components of the suspension lift kits described herein may preferably be fabricated from durable and strong materials for best performance. Overall, the invention has been described herein in considerable detail in order to comply with the patent statutes, and to provide these skilled in the art with the information needed to apply the novel principles and to construct and use embodiments of the invention as required. However, it is to be understood that various modifications can be accomplished without departing from the scope of the invention itself.

What is claimed is:

1. A vehicular suspension lift kit, comprising:
    a first component having first and second generally opposed sides, said first side having a first interlocking pattern having a first protrusion and a first recess, said first protrusion including a respective first protrusion outer surface that is contained in a first outer plane of said first side, wherein a first height of said first component is defined between said first outer plane and a second outer surface of said second side, said first recess defining a first protrusion wall extending from a first recess surface to said first outer plane, wherein said first interlocking pattern includes one or more of said protrusion walls; and
    a second component having first and second generally opposed sides and a second interlocking pattern having a second protrusion and a second recess, said second protrusion including a respective second protrusion outer surface that is contained in a second outer plane of said first side of said second component, a second height of said second component being defined between said second outer plane and said second side of said second component, said second recess defining a second protrusion wall extending from a second recess surface to said second outer plane wherein said second interlocking pattern is matingly engagable with said first interlocking pattern with said protrusion wall interacting with said second protrusion and said second protrusion wall interacting with said first protrusion to prevent relative motion among said first and second components along an interfacial plane parallel to said first and second outer planes, wherein a third height is defined between said second outer surface of said second side of said first component and said second side of said second component when said first and second interlocking patterns are matingly engaged with one another, a sum of said first and second heights being greater than said third height, at least one of said first and second components including a first guidepost that is of a configuration suitable for mating engagement with a first receptacle of another of said first and second components.

2. A vehicular suspension lift kit as in claim 1, including a third component having first and second opposed sides and a third interlocking pattern having a third protrusion and a third recess to permit mating engagement with said first or second components.

3. A vehicular suspension lift kit as in claim 2 wherein said second component includes a fourth interlocking pattern having a fourth protrusion and a fourth recess at said second side of said second component, said fourth protrusion including a respective fourth protrusion outer surface that is co-planar with a fourth outer plane at said second side of said second component.

4. A vehicular suspension lift kit as in claim 3 wherein said fourth interlocking pattern is a mirror image of said second interlocking pattern.

5. A vehicular suspension lift kit as in claim 3 wherein said third interlocking pattern is matingly engagable with said fourth interlocking pattern to prevent relative motion among said second and third components along an interfacial plane of engaged second and third components parallel to said second outer plane.

6. A method for adjusting suspension height of a vehicular leaf spring suspension, said method comprising:
    (a) providing a suspension lift kit having:
        (i) a first component having first and second generally opposed sides, said first side including a first receptacle in said first outer surface, and said second side including a first interlocking pattern having a first protrusion and a first recess, said first protrusion including a first protrusion outer surface that is contained in a first outer plane of said second side, said first component including a first guidepost, and a first height of said first component being defined between said first outer plane and said first outer surface of said first side; and
        (ii) a second component having first and second generally opposed sides and a second receptacle, said first side including a second interlocking pattern having a second protrusion and a second recess, said second protrusion including a second protrusion outer surface that is contained in a second outer plane of said first side of said second component, a second height of said second component being defined between said second outer plane and said second side of said second component, wherein said second interlocking pattern is matingly engagable with said first interlocking pattern to prevent relative motion among said first and second components along an interfacial plane parallel to said first and second outer planes; and
    (b) securing at least one of said first and second components between said vehicular leaf spring suspension and a vehicular axle housing, with a leaf spring guidepost of said vehicular leaf spring suspension matingly engaging within a respective one of said first and second receptacles, and said first guidepost matingly engaging within a housing receptacle within said vehicular axle housing.

7. A method as in claim 6, including securing both of said first and second components between said vehicular leaf spring suspension and a vehicular axle housing, with said first interlocking pattern of said first component being matingly engaged with said second interlocking pattern of said second component.

8. A method as in claim 7, further including:
    (a) providing a third component having first and second generally opposed sides and a third interlocking pattern having a third protrusion and a third recess, wherein said third interlocking pattern is matingly engagable with at least one of said first and second interlocking patterns to prevent relative motion among engaged components along an interfacial plane parallel to said first and second outer planes; and
    (b) securing said first, second, and third components between said vehicular leaf spring suspension and a vehicular axle housing, with said second interlocking pattern of said second component being matingly engaged with said third interlocking pattern of said third component.

9. A vehicular suspension lift kit, comprising:
    a first component having an axis, a base portion, an alignment portion, and a first interlocking pattern of first coupling features including at least one of a protrusion and a recess, said base portion having an outer wall that is spaced from an outer wall of said alignment portion to define a shoulder portion therebetween, said shoulder portion having a shoulder surface extending between said outer wall of said base portion and said outer wall of said alignment portion, said shoulder surface being nonparallel to at least one of said outer wall of said base portion and said outer wall of said alignment portion, said first component further including a base bottom surface and an upper surface defining a first total height therebetween, and a first receptacle in said base portion having an axial receptacle depth to define a first lift height of said first component, as a difference between said first total height and said receptacle depth, said first receptacle being configured to operably receive an alignment portion of a suspension receptacle; and a second component having an axis, a base portion, an alignment portion, and a second interlocking pattern of second coupling features cooperatively engageable with said first interlocking pattern of said first coupling features, said base portion having an outer wall that is spaced from an outer wall of said alignment portion to define a shoulder portion therebetween, said shoulder portion having a shoulder surface extending between said outer wall of said base portion and said outer wall of said alignment portion, said shoulder surface being non-parallel to at least one of said outer wall of said base portion and said outer wall of said alignment portion, said second component further including a base bottom surface and an upper surface defining a second total height therebetween, and a second receptacle in said base portion having an axial receptacle depth to define a second lift height of said second component, as the difference between said second total height and said second receptacle depth, said second lift height being different from said lift height, and said second receptacle being configured to operably receive the alignment portion of the suspension bracket or said alignment portion of said first component.

10. A vehicular suspension lift kit as in claim 9 wherein said shoulder surface is perpendicular to both said outer wall of said base portion and said outer wall of said alignment portion.

* * * * *